(12) United States Patent
Tang et al.

(10) Patent No.: US 10,014,126 B2
(45) Date of Patent: Jul. 3, 2018

(54) LITHIUM-ION SUPERCAPACITOR USING GRAPHENE-CNT COMPOSITE ELECTRODE AND METHOD FOR MANUFACTURING THE SAME

(71) Applicant: NATIONAL INSTITUTE FOR MATERIALS SCIENCE, Ibaraki (JP)

(72) Inventors: Jie Tang, Ibaraki (JP); Faxiang Qin, Ibaraki (JP); Luchang Qin, Ibaraki (JP)

(73) Assignee: National Institute for Materials Science, Ibaraki (JP)

( * ) Notice: Subject to any disclaimer, the term of this patent is extended or adjusted under 35 U.S.C. 154(b) by 0 days.

(21) Appl. No.: 15/121,463

(22) PCT Filed: Feb. 26, 2015

(86) PCT No.: PCT/JP2015/055691
§ 371 (c)(1),
(2) Date: Aug. 25, 2016

(87) PCT Pub. No.: WO2015/129820
PCT Pub. Date: Sep. 3, 2015

(65) Prior Publication Data
US 2016/0365199 A1    Dec. 15, 2016

(30) Foreign Application Priority Data

Feb. 28, 2014  (JP) ................................. 2014-037901
Nov. 17, 2014  (JP) ................................. 2014-232467

(51) Int. Cl.
*H01G 11/50* (2013.01)
*H01G 11/36* (2013.01)
(Continued)

(52) U.S. Cl.
CPC ............ *H01G 11/86* (2013.01); *H01G 11/06* (2013.01); *H01G 11/36* (2013.01); *H01G 11/62* (2013.01);
(Continued)

(58) Field of Classification Search
CPC ........ H01G 11/24; H01G 11/26; H01G 11/30; H01G 11/36; H01G 11/50
See application file for complete search history.

(56) References Cited

U.S. PATENT DOCUMENTS

2012/0075771 A1* 3/2012 Jin ........................ H01G 11/06
361/503
2012/0134072 A1  5/2012  Bae et al.
(Continued)

FOREIGN PATENT DOCUMENTS

JP   2013157603 A  *  8/2013  .......... H01G 9/0425
WO   2010/027336       3/2010
(Continued)

OTHER PUBLICATIONS

International Search Report dated May 19, 2015 in International Application No. PCT/JP2015/055691.
(Continued)

*Primary Examiner* — Eric Thomas
(74) *Attorney, Agent, or Firm* — Wenderoth, Lind & Ponack, L.L.P.

(57) ABSTRACT

As an object to provide a lithium-ion supercapacitor having a high energy density and a high power density, capable of being charged and discharged many times, and having a long product life, there is provided a lithium-ion supercapacitor using a graphene/CNT composite electrode, the lithium-ion supercapacitor including: an anode; a cathode that is arranged to be separated from the anode; and a lithium ion electrolytic solution that fills in a space between the anode
(Continued)

and the cathode, wherein either or both of the cathode and the anode are formed by a graphene/CNT composite, and a CNT concentration in the graphene/CNT composite is 17 wt % or more and 33 wt % or less.

15 Claims, 21 Drawing Sheets

(51) Int. Cl.
    *H01G 11/86*     (2013.01)
    *H01G 11/06*     (2013.01)
    *H01G 11/62*     (2013.01)
    *H01G 11/52*     (2013.01)

(52) U.S. Cl.
    CPC .............. *H01G 11/50* (2013.01); *H01G 11/52* (2013.01); *Y02E 60/13* (2013.01)

(56) References Cited

U.S. PATENT DOCUMENTS

| | | | |
|---|---|---|---|
| 2013/0148265 | A1 | 6/2013 | Okuno et al. |
| 2013/0252499 | A1 | 9/2013 | Zhou et al. |
| 2013/0295374 | A1 | 11/2013 | Tang et al. |
| 2014/0212656 | A1 | 7/2014 | Rudhardt et al. |
| 2016/0118198 | A1* | 4/2016 | Okuno ................... H01G 11/38 361/502 |

FOREIGN PATENT DOCUMENTS

| | | |
|---|---|---|
| WO | 2012/073998 | 6/2012 |
| WO | 2013/026827 | 2/2013 |
| WO | 2013/073526 | 5/2013 |
| WO | 2014/021257 | 2/2014 |

OTHER PUBLICATIONS

Yanwu Zhu et al., "Carbon-Based Supercapacitors Produced by Activation of Graphene", Science 332, 1537 (2011).
Junbo Hou et al., "Graphene-based electrochemical energy conversion and storage: fuel cells, supercapacitors and lithium ion batteries", PCCP 13, 15384 (2011).
Yi Huang et al., "An Overview of the Applications of Graphene-Based Materials in Supercapacitors", Small 8, 1805 (2012).
John R. Miller et al., "Electrochemical Capacitors for Energy Management", Science 321, 651 (2008).
Manikoth M. Shaijumon et al., "Synthesis of hybrid nanowire arrays and their application as high power supercapacitor electrodes", Chem Commun., 2373 (2008).
Qian Cheng et al., "Graphene and carbon nanotube composite electrodes for supercapacitors with ultra-high energy density", PCCP 13, 17615 (2011).
K.S. Novoselov et al., "Electric Field Effect in Atomically Thin Carbon Films", Science 306, 666 (2004).
Yanwu Zhu et al., "Graphene and Graphene Oxide: Synthesis, Properties, and Applications", Adv. Mater. 22, 3906 (2010).
Vincent C. Tung et al., "High-throughput solution processing of large-scale graphene", Nat Nano 4, 25 (2009).
Jun Yan et al., "Electrochemical properties of graphene nanosheet/ carbon black composites as electrodes for supercapacitors", Carbon 48, 1731 (2010).
Sasha Stankovich et al., "Synthesis of graphene-based nanosheets via chemical reduction of exfoliated graphite oxide", Carbon 45, 1558 (2007).
Feifei Zhang et al., "Hybrid graphene electrodes for supercapacitors of high energy density", Chem. Phys. Lett. 584, 124 (2013).
Meryl D. Stoller et al., "Activated graphene as a cathode material for Li-ion hybrid supercapacitors", PCCP 14, 3388 (2012).
Ji Hoon Lee et al., "Functionalized Graphene for High Performance Lithium Ion Capacitors", ChemSusChem 5, 2328 (2012).

\* cited by examiner (a)

(b)

Pore size and surface area distribution of CNT/graphene(rGO)

Pore Size Distribution

Surface Area Distribution (a)

40
EMI-TFSI (b)

(a)

(b)

(c)

LITHIUM-ION SUPERCAPACITOR USING GRAPHENE-CNT COMPOSITE ELECTRODE AND METHOD FOR MANUFACTURING THE SAME

TECHNICAL FIELD

The present invention relates to a lithium-ion supercapacitor using a graphene-CNT composite electrode and a method for manufacturing the lithium-ion supercapacitor.

BACKGROUND ART

Hitherto, a lithium ion battery (hereinafter, abbreviated to an LIB) has been known, and FIG. 1 is a conceptual diagram that illustrates an example of the LIB. The LIB is configured, for example, by an anode 1 having graphite as a negative electrode active material, a cathode 2 having $LiCoO_2$ as a positive electrode active material, and an electrolytic solution 3. According to an electric field, lithium ions eluted from $LiCoO_2$ of the cathode 2 into the electrolytic solution 3 move between electrodes in the electrolytic solution 3 and are maintained between graphite layers of the anode 1, whereby the function of a battery is implemented. However, the LIB has a configuration in which electric energy is stored according to chemical reactions in the electrodes. Accordingly, while the energy density is high, the power density is low. In addition, there is a problem in that deterioration according to charging/discharging is intense, and the product life is short.

Further, an electric double-layer capacitor (hereinafter, abbreviated as an EDLC) is known and FIG. 2 is a conceptual diagram that illustrates an example of the electric double-layer capacitor. The EDLC is configured, for example, by an anode 4 formed by activated carbon (abbreviated to AC), a cathode 5 formed by AC, and an electrolytic solution 6. Acted to an electric field, cations and anions disposed inside the electrolytic solution 6 are respectively moved to the surfaces of mutually-different electrodes, are attached to the surfaces, and form an electric double layer on the surfaces of the electrodes, whereby the function of a capacitor is implemented (Non Patent Literature 1). This EDLC has been reviewed for applications to a so-called supercapacitor (Non Patent Literature 2).

The supercapacitor is a capacitor of which the performance is improved more than a normal capacitor and is also called an ultracapacitor. Since ion molecules are configured to store electric charge, the supercapacitor can perform charging/discharging of $10^5$ times or more, has a long product life, and has a low maintenance cost by employing a simple principle (Non Patent Literature 3). In addition, the supercapacitor has a power density higher than the LIB and thus, is expected to be applied to a memory backup system and an energy storing system such as an industrial power supply apparatus (Non Patent Literature 4). However, there is a problem in that the energy density of the supercapacitor is lower than that of the LIB by several tens of times.

A lithium ion capacitor (hereinafter, abbreviated to as an LIC) is also known. FIG. 3 is a conceptual diagram that illustrates an example of the lithium ion capacitor.

The LIC is configured, for example, by an anode 7 formed by Li-doped carbon, a cathode 8 formed by activated carbon, and an electrolytic solution 9. According to an electric field, lithium ions and negative ions disposed inside the electrolytic solution 9 are moved to the surfaces of mutually-different electrodes and are attached to the surfaces of the electrodes. Accordingly, the function of a capacitor is implemented. The Li-doped carbon of the anode 7, for example, is acquired by adding lithium ions between graphite layers.

FIGS. 4(a) and 4(b) are conceptual diagrams that illustrate an example of the operation principle of the LIC.

As illustrated in FIG. 4(b), in a state in which no electric field is applied to electrodes in the anode 7, for example, ionic-bonded $Li^+PF_6^-$ floats inside the electrolytic solution 9. Next, by applying an electric field to the electrodes, as illustrated in FIG. 4(a), lithium ions are inserted between graphite layers, $PF_6^-$ ions are attached to the surface of activated carbon in the cathode 8, and an electric double layer 100 is formed on the surface of the activated carbon so as to be charged. When the application of the electric field to the electrodes is stopped, the ions are moved from the electrodes to the inside of the electrolytic solution and are ionic-bonded so as to be discharged. Such a cycle is repeated.

In this principle, as illustrated in FIGS. 4(a) and 4(b), the anode 7 formed by the Li-doped carbon serves as an energy source for insertion/drawing-out of the lithium ions. In this way, the energy density can be raised up to the level of a lithium ion battery. By adding lithium ions to the carbon in advance, the energy density can be further raised.

In addition, the cathode 8 formed by the activated carbon serves as a power source. In this way, the product life can be increased like the electric double layer capacitor, and the power density can be raised.

However, the energy density of the LIC is higher than that of the supercapacitor (EDLC) by several times but is still lower than that of the LIB by several tens of times.

Carboneous materials represented by activated carbon usually have properties of (1) a large surface area (SSA), (2) high electric conductivity, and (3) a uniform distribution of many pores having a pore diameter that can be accessed by electrolytic ions (Non Patent Literature 5).

Accordingly, various carboneous materials are reviewed for the use as electrodes by using such properties.

For example, a carbon nano tube (hereinafter, abbreviated to a CNT) that is one of carboneous materials has been drawing attention. However, the CNT has problems in that the accessibility of electrolytic ions is low, and the SSA is small (Non Patent Literature 6).

Meanwhile, graphene that is another carboneous material has a uniform distribution of many pores having a pore diameter that can be accessed by electrolytic ions, high electric conductivity, and a large SSA (26,302/g). It is reported that, by using such graphene, the energy storage performance can be improved (Non Patent Literatures 7 and 8) and reduced graphene formed by a chemical reduction method can reduce a manufacturing cost (Non Patent Literature 9). However, it is pointed out that a problem occurs in that the electric conductivity decreases due to the influence of restocking and a functional group according to a Van der waals force (Non Patent Literature 10).

The applications of graphene to capacitors have been reviewed from various viewpoints. For example, a supercapacitor including an electrode including an activated carbon layer and a graphene layer has been proposed (Patent Literature 1). Applications of graphene to a supercapacitor using graphene as a nano structure as the material of an electrode have also been reviewed (Patent Literature 2 and Non Patent Literature 11).

In addition, a CV curve of EDLCs has been reported to be symmetrical (Non Patent Literature 12).

Furthermore, the characteristics according to a Li insertion/non-insertion process have been reported (Non Patent Literature 13).

It is reported that, in a case where Urea-RGO is used as the material of the cathode, the specific capacitance is 126 F/g, and the energy density is 105 Wh/kg (Non Patent Literature 14).

CITATION LIST

Patent Literature

Patent Literature 1: JP 2012-114396 A
Patent Literature 2: JP 2012-502467 W

Non Patent Literature

Non Patent Literature 1: Y. Zhu, S. Murali, M. D. Stoller, K. J. Ganesh, W. Cai, P. J. Ferreira, A. Pirkle, R. M. Wallace, K. A. Cychosz, M. Thommes, D. Su, E. A. Stach, and R. S. Ruoff, Science 332, 1537 (2011)
Non Patent Literature 2: J. Hou, Y. Shao, M. W. Ellis, R. B. Moore, and B. Yi, PCCP 13, 15384 (2011)
Non Patent Literature 3: Y. Huang, J. Liang, and Y. Chen, Small 8, 1805 (2012)
Non Patent Literature 4: J. R. Miller and P. Simon, Science 321, 651 (2008)
Non Patent Literature 5: M. M. Shaijumon, F. S. Ou, L. Ci, and P. M. Ajayan, Chem. Commun., 2373 (2008)
Non Patent Literature 6: Q. Cheng, J. Tang, J. Ma, H. Zhang, N. Shinya, and L. -C. Qin, PCCP 13, 17615 (2011)
Non Patent Literature 7: K. S. Novoselov, A. K. Geim, S. V. Morozov, D. Jiang, Y. Zhang, S. V. Dubonos, I. V. Grigorieva, and A. A. Firsov, Science 306, 666 (2004)
Non Patent Literature 8: Y. Zhu, S. Murali, W. Cai, X. Li, J. W. Suk, J. R. Potts, and R. S. Ruoff, Adv. Mater. 22, 3906 (2010)
Non Patent Literature 9: V. C. Tung, M. J. Allen, Y. Yang, and R. B. Kaner, Nat Nano 4, 25 (2009)
Non Patent Literature 10: J. Yan, T. Wei, B. Shao, F. Ma, Z. Fan, M. Zhang, C. Zheng, Y. Shang, W. Qian, and F. Wei, Carbon 48, 1731 (2010)
Non Patent Literature 11: S. Stankovich, D. A. Dikin, R. D. Piner, K. A. Kohlhaas, A. Kleinhammes, Y. Jia, Y. Wu, S. T. Nguyen, and R. S. Ruoff, Carbon 45, 1558 (2007)
Non Patent Literature 12: F. Zhang, J. Tang, N. Shinya, and L. -C. Qin, Chem. Phys. Lett. 584, 124 (2013)
Non Patent Literature 13: M. D. Stoller, S. Murali, N. Quarles, Y. Zhu, J. R. Potts, X. Zhu, H. -W. Ha, and R. S. Ruoff, PCCP 14, 3388 (2012)
Non Patent Literature 14: J. H. Lee, W. H. Shin, M. -H. Ryou, J. K. Jin, J. Kim, and J. W. Choi, ChemSusChem 5, 2328 (2012)

SUMMARY OF INVENTION

Technical Problem

An object of the present invention is to further improve advantages of conventional supercapacitors (EDLC) and lithium ion capacitors (LIC) having a high output density and a low energy density, to overcome disadvantages thereof based on the background as described above, and to provide a lithium-ion supercapacitor that has a high energy density and a high power density, is capable of being charged and discharged many times, and has a long product life.

Solution to Problem

The present inventors have continued the review of graphene-based electrodes that has drawn attention for long and trial-and-error and found that, by including a cathode using a graphene/CNT composite acquired by adding a CNT of a predetermined concentration, the CNT having high electric conductivity improves conductivity in the thickness direction of the graphene and serves as a spacer preventing restocking of a graphene layer. In addition, in this cathode, many pores having a pore diameter of 2 nm or more and 50 nm or less are formed to be uniformly distributed, and electrolytic ions can easily access a graphene activation face. According to such factors, it has been found that a lithium-ion supercapacitor having an increased energy density and an increased number of charging/discharging cycles can be manufactured, and the present invention has been completed.

In addition, the inventors have further continued trial-and-error and succeeded in increasing the energy density and the number of charging/discharging cycles even in a case where an anode using a graphene/CNT composite is included.

Furthermore, the inventors have found that, by using a lithium-ion supercapacitor using a graphene/CNT composite for both the cathode and the anode, the energy density can be raised, and the number of charging/discharging cycles can be raised, thereby completing the present invention.

The present invention completed according to the above circumstances has the following features.

(1) A lithium-ion supercapacitor using a graphene/CNT composite electrode, the lithium-ion supercapacitor including: an anode; a cathode that is arranged to be separate from the anode; and a lithium ion electrolytic solution that fills a space between the anode and the cathode, wherein one or both of the cathode and the anode are formed by a graphene/CNT composite, and a CNT concentration in the graphene/CNT composite is 17 wt % or more and 33 wt % or less.

(2) The lithium-ion supercapacitor using the graphene/CNT composite electrode, wherein the CNT concentration in the graphene/CNT composite is 17 wt % or more and 20 wt % or less.

(3) The lithium-ion supercapacitor using the graphene/CNT composite electrode, wherein the graphene/CNT composite is a porous body.

(4) The lithium-ion supercapacitor using the graphene/CNT composite electrode, wherein pores having a pore diameter of 2 nm or more and 50 nm or less are formed in the porous body.

(5) The lithium-ion supercapacitor using the graphene/CNT composite electrode, wherein the lithium ion electrolytic solution is a $LiPF_6$-dispersed solution.

(6) The lithium-ion supercapacitor using the graphene/CNT composite electrode, wherein the anode is graphite or lithium ion-added graphite.

(7) The lithium-ion supercapacitor using the graphene/CNT composite electrode, wherein a separator is arranged between the anode and the cathode, and the separator is a porous polymer film or a glass fiber.

(8) A method for manufacturing a lithium-ion supercapacitor using a graphene/CNT composite electrode, the method including: synthesizing graphene by synthesizing graphene oxide using a modified Hummer's method and then reducing the graphene oxide; preparing a suspension by mixing the graphene and CNTs in an organic solvent such that a CNT concentration in a total amount is 17 wt % or more and 33 wt % or less and then forming a film-like graphene/CNT composite by filtering the suspension; and configuring the film-like graphene/CNT composite as one electrode, arranging a counter electrode formed by graphite, lithium-added graphite, or a lithium foil to face one face of the one electrode through a separator formed by a porous polymer film or a glass fiber, and then filling a space between the electrodes with a lithium ion electrolytic solution.

Advantageous Effects of Invention

According to a lithium-ion supercapacitor using a graphene/CNT composite electrode according to the present invention, it is possible to provide a lithium-ion supercapacitor that has a high energy density and a high power density, is capable of being charged and discharged many times, and has a long product life.

In addition, according to a method for manufacturing a lithium-ion supercapacitor using a graphene/CNT composite electrode according to the present invention, it is possible to easily manufacture a lithium-ion supercapacitor using a graphene/CNT composite cathode that has a high energy density and a high power density, is capable of being charged and discharged many times, and has a long product life.

BRIEF DESCRIPTION OF DRAWINGS

FIG. 31(a) illustrates CV profiles for mutually-different scanning speeds, FIG. 31(b) illustrates charge/discharge profiles for mutually-different current densities, and 31(c) illustrates graphs that illustrate rate capabilities.

DESCRIPTION OF EMBODIMENTS (Lithium-ion Supercapacitor)

First, an exemplary embodiment of a lithium-ion supercapacitor using a graphene/CNT composite electrode of the present invention will be described.

FIGS. 5(a) to 5(d) are diagrams that illustrate examples of an lithium-ion supercapacitor using a graphene/CNT composite electrode and are a plan view (a), a side view (b), and a side-exploded view (c) of a coin cell including the lithium ion supercapacitor using a graphene/CNT composite electrode, and a full cell diagram (d).

Figure 1:
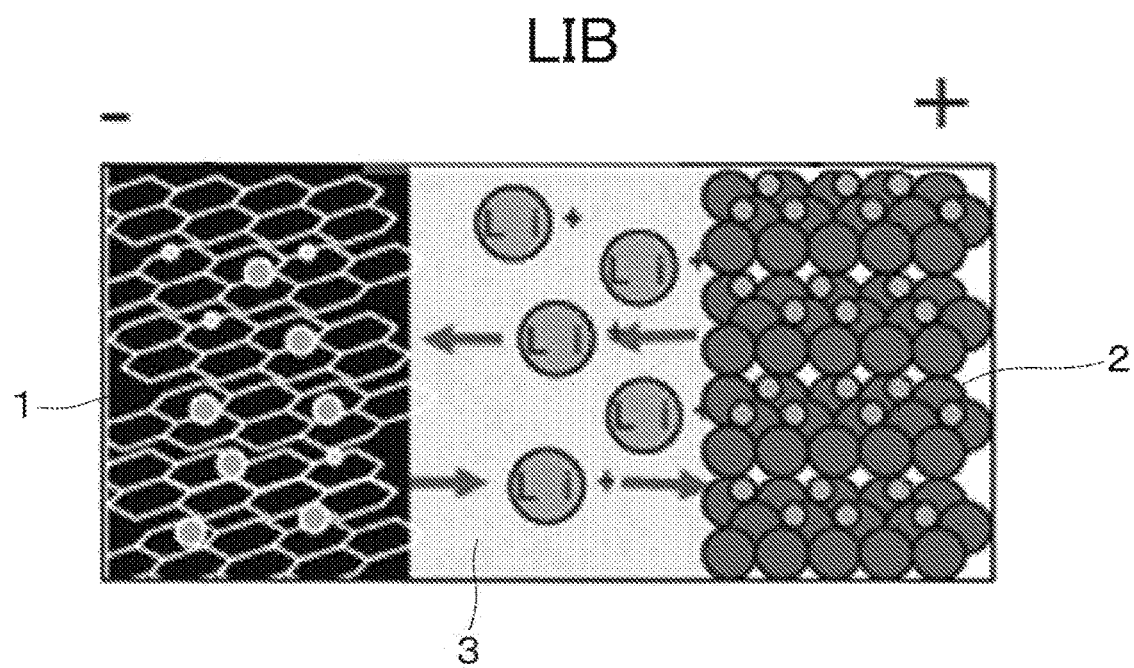
FIG. 1 is a conceptual diagram that illustrates an example of a lithium ion battery (LIB).
Figure 2:
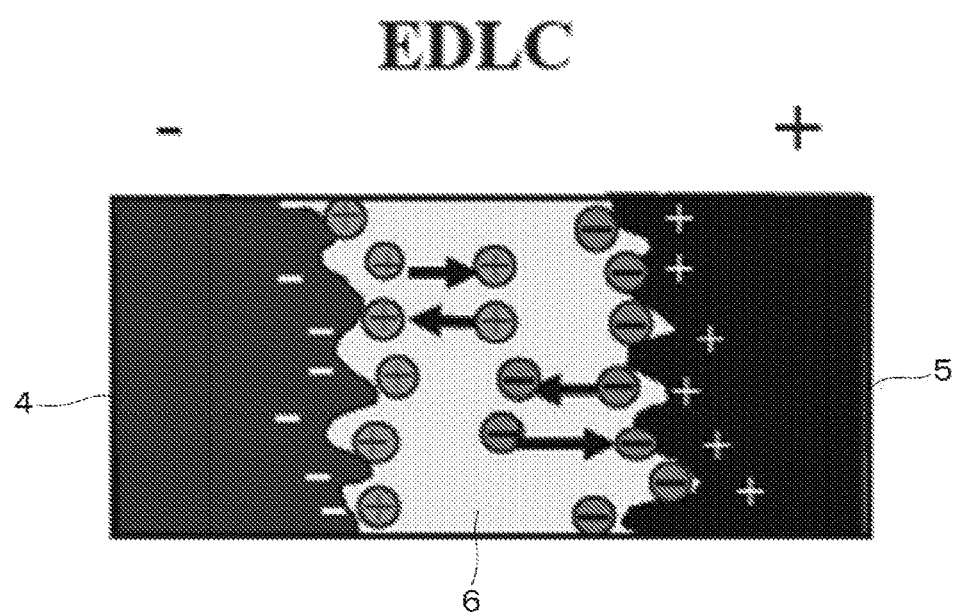
FIG. 2 is a conceptual diagram that illustrates an example of an electric double-layer capacitor (electrochemical double-layer capacitor: (EDLC)).
Figure 3:
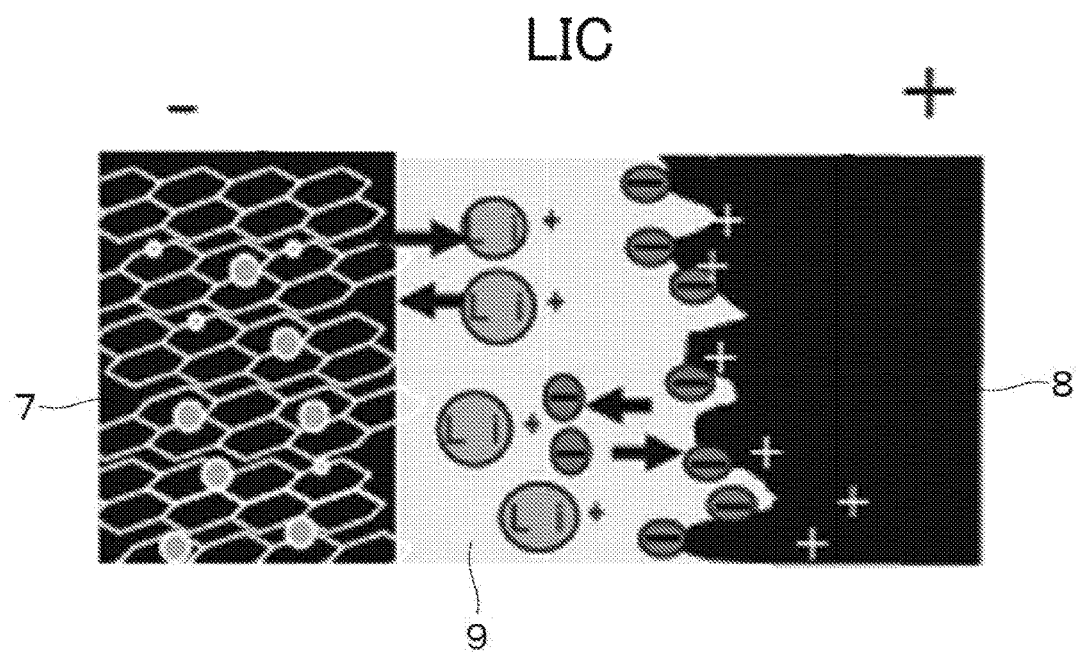
FIG. 3 is a conceptual diagram that illustrates an example of a lithium-ion supercapacitor (LIC).
Figure 4:
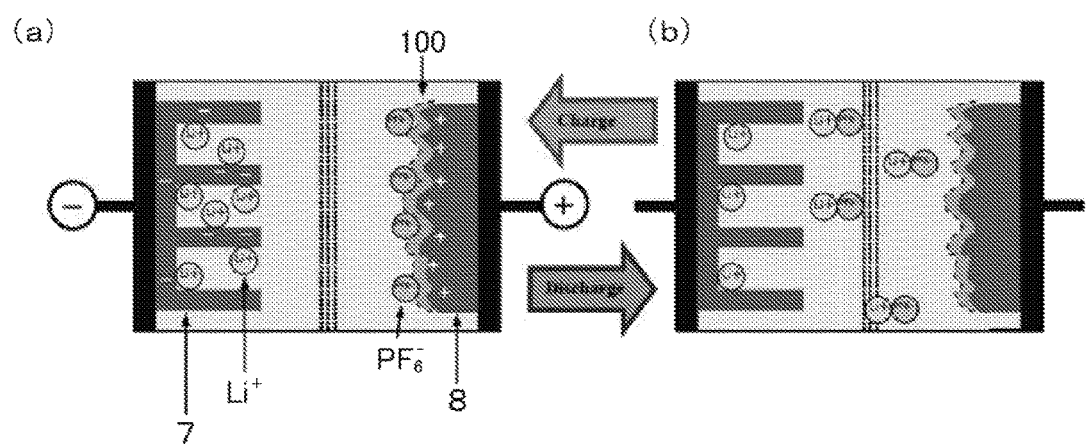
FIGS. 4(a) and 4(b) are conceptual diagrams that illustrate an example of the operation principle of the LIC.
Figure 5:
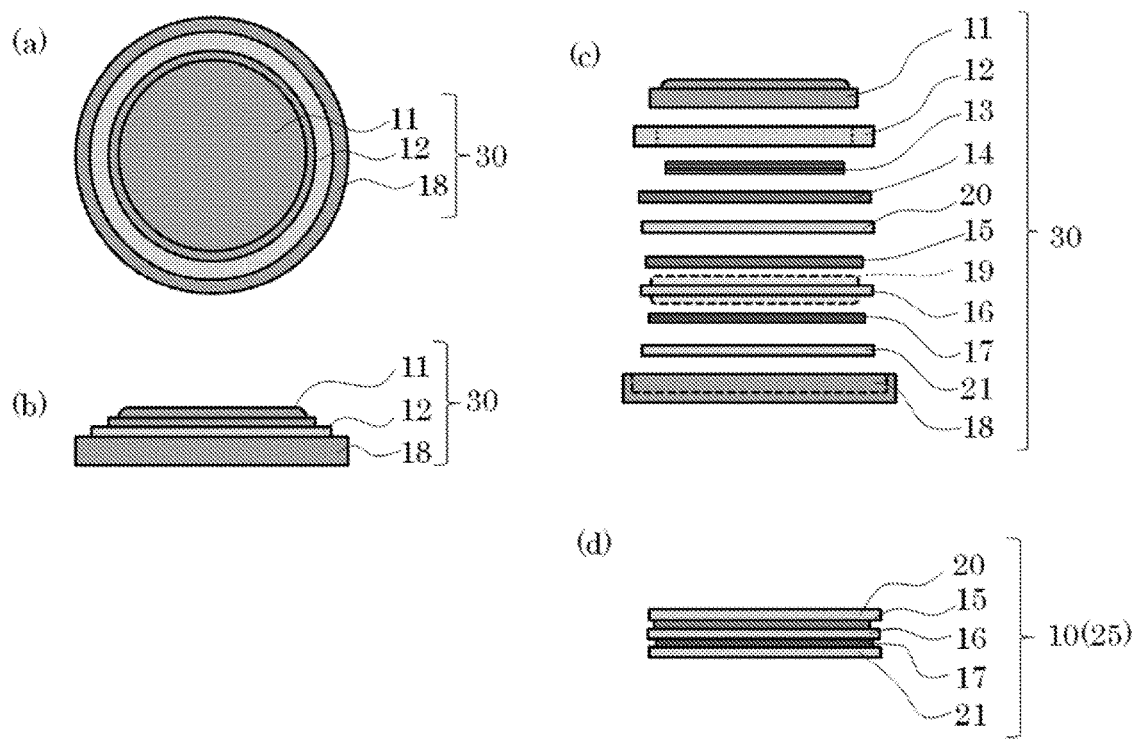
FIGS. 5(a) to 5(d) are diagrams that illustrate examples of an lithium-ion supercapacitor using a graphene/CNT composite electrode and are a plan view (a), a side view (b), and a side-exploded view (c) of a coin cell including the lithium ion supercapacitor using a graphene/CNT composite electrode, and a full cell (d).

As illustrated in FIGS. 5(a) and 5(b), the coin cell 30 includes a coin cell case 18, a gasket 12, and a coin cell cap 11. Each of the constituent members has a circular shape in the plan view, and the coin cell cap 11 is configured to be fitted to the coin cell case 18 so as to seal the inside through the gasket 12.

As illustrated in FIG. 5(c), the gasket 12 has a circular shape and is configured to be fixable by pressing a member acquired by overlapping a steel spacer 14, a current collector 20, an anode 15, a separator 16, a cathode 17, and a current collector 21 in the mentioned order from a spring 13 side to a bottom inside a concave portion of the coin cell case 18 by using the spring 13 arranged inside the circle. Here, as illustrated in FIG. 5(d), the lithium-ion supercapacitor 10 using the graphene/CNT composite electrode is, as a full cell 25, formed by overlapping the current collector 20, the anode 15, the separator 16, the cathode 17, and the current collector 21 in the mentioned order.

For example, as the cathode 17, a graphene/CNT composite is used, and a space between the anode 15 and the cathode 17 is filled with a lithium ion electrolytic solution 19. In this way, the lithium-ion supercapacitor 10 using the graphene/CNT composite electrode is configured.

Figure 6:
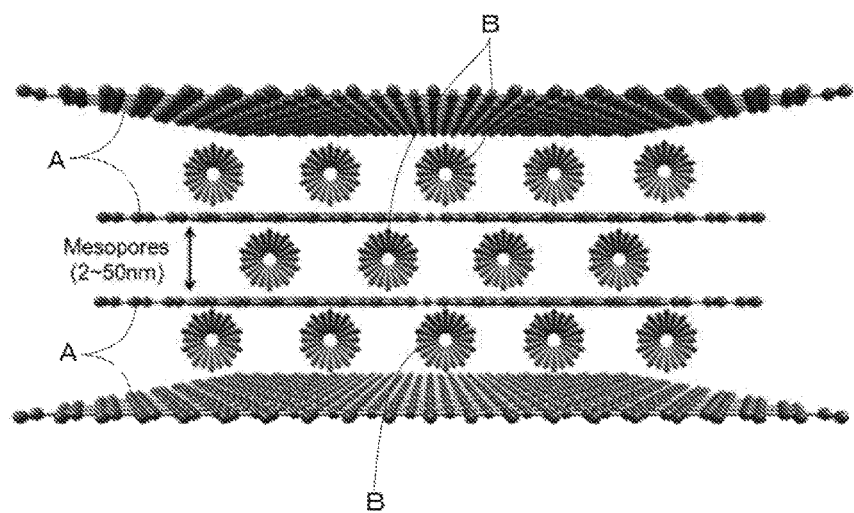
FIG. 6 is a conceptual diagram that illustrates an example of a graphene/CNT composite.

FIG. 6 is a conceptual diagram that illustrates an example of a graphene/CNT composite.

As illustrated in FIG. 6, in the graphene/CNT composite, CNTs (B) are inserted between graphene layers (A). In the example illustrated in FIG. 6, while graphene layers (A) are regularly arranged at an equal space so as to face each other, the arrangement is not limited thereto but may be randomly arranged. In addition, while CNTs (B) are regularly arranged at an equal space so as to be parallel to each other, the arrangement is not limited thereto but may be randomly arranged.

For example, in the graphene/CNT composite having the configuration illustrated in FIG. 6, by arranging the CNTs having high electric conductivity between graphene layers, the electric conductivity in the thickness direction of the graphene is improved. In addition, the CNTs serve as a spacer preventing restocking of the graphene layers between the graphene layers, and a state in which the activation face of the graphene is exposed can be formed. In addition, by arranging the CNTs between the graphene layers, many pores having a pore diameter of 2 nm or more and 50 nm or less are formed between the graphene layers, and electrolytic ions can easily access the activation face of the graphene.

According to such effects, the cathode characteristics are improved, and accordingly, the lithium-ion supercapacitor using a graphene/CNT composite cathode can raise the energy density and the power density, and the charging/discharging cycle is lengthened.

In the graphene/CNT composite, the mass ratio of the CNTs to the graphene is 17 wt % or more and 33 wt % or less. The mass ratio is more preferably 17 wt % or more and 20 wt % or less.

In a case where the mass ratio is less than 17 wt %, the electric conductivity in the thickness direction can be sufficiently raised. In addition, according to partial restocking, the exposed area of the activation face of the graphene is decreased. Furthermore, the number of pores is not sufficient, and the electrolytic ions cannot easily access the activation face of the graphene. According to such factors, the energy density and the power density are decreased, and the charging/discharging cycle is shortened.

To the contrary, in a case where the mass ratio exceeds 33 wt %, the amount of CNTs per unit volume is too large, the exposed area of the activation face of the graphene per unit volume is decreased. Accordingly, the energy density and the power density are decreased, and the charging/discharging cycle is shortened.

The CNT is not particularly limited, but for example, a single-walled carbon nano tube (hereinafter, abbreviated to SWCNT) may be used suitably. In addition, a double-layer carbon nano tube (DWCNT) or a carbon nano tube of more layers may be used.

As the SWCNT, more specifically, a tube having a diameter of 1 nm or more and 2 nm or less and a length of 5 mm or more and 30 mm or less may be used suitably. A commercial product can also be used without performing any process.

As the anode 15 in FIGS. 5(c) and 5(d), it is preferable to use graphite or graphite to which lithium ions are added. In the graphite, lithium ions can be sufficiently stored between layers. The concentration of lithium ions added to the graphite is appropriately set. By storing lithium ions in the anode 15 in advance, the charging/discharging characteristics are improved, and the energy density and the power density can be improved.

Here, a configuration in which graphite or graphite to which lithium ions are added is used as the anode 15 will be referred to as a full-cell type lithium-ion supercapacitor. In addition, a configuration in which a Li foil is used as the anode 15, and the current collector 20 disposed on the anode side is not used will be referred to as a half-cell type lithium-ion supercapacitor and, generally, is used as an evaluation sample of cathode characteristics.

The graphene/CNT has a large capacity generated based on a large surface area, a mesoporous structure, and good conductivity and thus, can be used as a cathode of which the material is substituted by activated carbon (AC) in the EDLC and in the LIC of this case. Basically, a good material for the EDLC that is the cathode of the LIC needs to be picked up.

This material after pre-doping has a large capacity of Li, a good rate capability, and a kinetic property and thus, can be used as an anode in a cell or an LIC of which the material is replaced by graphite. Basically, it is necessary to find out an anode of a good cell having a low lithiation voltage that is the anode of the LIC.

In this way, the dual graphene/CNT LIC can be built, and the same material can be used for both the electrodes, and both the electrodes can easily match each other.

As the separator 16 as illustrated in FIGS. 5(c) and 5(d), a porous polymer film, a glass fiber film, or the like can be used. As the porous polymer film, various kinds of films may be used, and, for example, a polypropylene (PP) film may be used as a preferable porous polymer film.

As the lithium ion electrolytic solution 19, a solution acquired by dispersing lithium ions into an organic solvent can be used. For example, liquid in which ionic-bonded material of lithium ions and various negative ions is dispersed may be used, and a $Li:PF_6$ dispersed solution may be preferably used. The $LiPF_6$ is decomposed into lithium ions and $PF_6^-$ ions in the organic solvent and are used for charging electrodes. The concentration of $LiPF_6$ is preferably 0.1 mol/L or more and is more preferably 0.5 mol/L or more. In a case where the concentration of $LiPF_6$ is 0.1 mol/L or less, the energy density is low.

As the organic solvent, various solvents including known solvents may be used, and, for example, one of ethylene carbonate (abbreviated to EC), diethyl carbonate (abbreviated to DEC), propylene carbonate (abbreviated to PC), and dimethyl carbonate (abbreviated to DMC) may be used, or two or more thereof may be mixed and used. For example, a mixed organic solvent acquired by mixing EC and DEC at the ratio of 1:1 (v/v) may be used.

(Method for Manufacturing Graphene/CNT Composite)

Next, an example of a method for manufacturing a lithium-ion supercapacitor using a graphene/CNT composite electrode will be described as an embodiment of the present invention.

The method for manufacturing a lithium-ion supercapacitor using a graphene/CNT composite electrode of the present invention includes: a reduced graphene synthesizing process S1; a graphene/CNT composite forming process S2; and a capacitor manufacturing process S3.

(Reduced Graphene Synthesizing Process S1)

In this process, after graphene oxide is synthesized from graphite using a modified Hummer's method, the graphene oxide is reduced, whereby reduced graphene is synthesized.

Here, a "Hummers method" is a method for manufacturing graphene oxide (GO) using $KMnO_4$ and $NaNO_3$ containing in concentrated $H_2SO_4$ (W. S. Hummers, Offeman, R. E. preparation of graphitic oxide. J Am Chem Soc 80 (1958)). Here, "modification" represents a long oxidation time.

The method of synthesizing graphene according to this modified Hummers method, for example, is performed in the following sequence as a more specific process.

1) That is, first, graphite and $NaNO_3$ are mixed inside a flask, and, after $H_2SO_4$ is added, the suspension is agitated using an ice bath.

2) Potassium permanganate is slowly added to the suspension, and the mixture is agitated inside a flask for two hours.

3) Distilled water is added and agitated.

4) An ultrasonic treatment is performed for the suspension.

5) Centrifugation is performed.

6) A vacuum drying process is performed.

In the way described above, graphene oxide (abbreviated to a GO) is synthesized.

7) Particles of the graphene oxide are dispersed into distilled water, and an ultrasonic treatment is performed for the particles, whereby a suspension is prepared.

8) The suspension is slowly heated on a hot plate. For example, the heating temperature is 100° C.

9) Hydrazine hydrate (hydrazine monohydrate) is added, and the suspension is maintained for a predetermined time at a temperature near the heating temperature described above. For example, conditions of 98° C. and 24 hours are applied.

10) The suspension is filtered.

11) Black powders are washed using distilled water several times, and, after excessive hydrazine is eliminated, again, resultant powders are dispersed into water, and an ultrasonic treatment is performed for the powders, whereby a suspension is prepared.

12) The suspension is centrifuged. For example, conditions of 4000 rpm and 3 minutes are applied.

13) The suspension is vacuum-filtered.

14) A vacuum drying treatment is performed for resultant powders.

In the way described above, graphene is synthesized.

(Graphene/CNT composite Forming Process S2)

In this process, for example, the following sequence may be performed.

1) First, single-walled carbon nano tubes (SWCNT) are prepared.

2) The SWCNTs are weighed such that the concentration of the CNT in a total amount is 17 wt % or more and 33 wt % or less, and, after graphene and the SWCNTs are mixed inside an organic solvent, an ultrasonic treatment is performed for the mixture, whereby a suspension is prepared.

As the organic solvent, for example, ethanol is used. In addition, the concentration of the CNT in a total amount is more preferably 17 wt % or more and 20 wt % or less. A mass ratio of the preparation is equal to that of the product.

3) The suspension is vacuum-filtered using a micro porous filter, whereby a film-like object is acquired.

4) The film-like object is dried.

5) The dried film-like object is cut out into a circular shape having a diameter of 15 mm in accordance with the shape of the cathode.

According to the process described above, a graphene/CNT composite having a film shape is generated.

(Capacitor Manufacturing Process S3)

The capacitor manufacturing process will now be described with examples of FIGS. 5(a) to 5(d) as a reference example. After the coin cell cap 11, the circle-shaped gasket 12, the spring 13, the steel spacer 14, the current collector 20, the lithium-ion supercapacitor 10, the current collector 21, and the coin cell case 18 are arranged to overlap each other in the mentioned order, the coin cell cap 11 is fitted to the coin cell case 18 so as to be fixed, whereby the coin cell 30 is manufactured.

The lithium-ion supercapacitor 10 is, for example, manufactured by overlapping the anode 15 formed by lithium ion-added graphite, the separator 16, and the cathode 17 formed by a film-like graphene/CNT composite in the mentioned order and then, filling a space between the anode 15 and the cathode 17 with the lithium ion electrolytic solution 19.

As the separator 16, for example, a porous polymer film or a glass fiber may be used. As the lithium ion electrolytic solution 19, for example, a solution acquired by dispersing $LiPF_6$ into an organic solvent is used. As the anode 15, graphite or a Li foil may be used. In a case where the Li foil is used as the anode 15, the steel spacer 20 may be omitted.

In the way described above, a coin cell including the lithium-ion supercapacitor using the graphene/CNT composite electrode is manufactured.

For example, according to the lithium-ion supercapacitor 10 using the graphene/CNT composite electrode according to the present invention described as an example of the embodiment above, the following remarkable effects are realized.

1; When the lithium-ion supercapacitor is configured to include the anode 15, the cathode 17 arranged to be separate from the anode 15, and the lithium ion electrolytic solution 19 filling a space between the anode 15 and the cathode 17, have one of the cathode 17 and the anode or both thereof to be formed using the graphene/CNT composite, and have a concentration of the CNT of 17 wt % or more and 33 wt % or less in the graphene/CNT composite, the lithium-ion supercapacitor having a high energy density and a high power density, being capable of being charged and discharged many times, and having a long product life can be provided.

2; When the lithium-ion supercapacitor is configured to have a concentration of the CNT of 17 wt % or more and 20 wt % or less in the graphene/CNT composite, the lithium-ion supercapacitor having a high energy density and a high power density, being capable of being charged and discharged many times, and having a long product life can be provided.

3; When the graphene/CNT composite has a configuration of a porous body, ions can easily access the activation face of the graphene, and thus, the energy density and the power density are high, and charging/discharging can be performed many times.

4; When pores having a pore diameter of 2 nm or more and 50 nm or less are formed in the porous body, the energy density and the power density are high, and charging/discharging can be performed many times.

5; When the lithium ion electrolytic solution 19 is configured to be the $LiPF_6$-dispersed solution, the energy density and the power density are high, and charging/discharging can be performed many times.

6; When the anode 15 is formed by using a carboneous material and the carboneous material is graphite or lithium ion-added graphite, the energy density and the power density are high, and charging/discharging can be performed many times.

7; When the separator 16 is arranged between the anode 15 and the cathode 17, and the separator 16 is a porous polymer film or a glass fiber, the lithium-ion supercapacitor having a long product life can be provided.

The process of manufacturing the lithium-ion supercapacitor using the graphene/CNT composite electrode of the present invention is configured to include, as in the embodiment described above: a process of synthesizing reduced graphene by synthesizing graphene oxide using the modified Hummer's method and then reducing the graphene oxide; a process of forming a film-like graphene/CNT composite by preparing a suspension by mixing graphene and CNTs in the organic solvent such that the concentration of the CNTs in the total amount is 17 wt % or more and 33 wt % or less and then, filtering the suspension; and a process of using the film-like graphene/CNT composite as one electrode (the cathode 17), arranging a counter electrode (the anode 15) formed using graphite, Li-added graphite, or an Li foil to face one face of the one electrode through the separator 16 formed using a porous polymer film or a glass fiber and then filling a space between the electrodes of the anode 15 and the cathode 17 with the lithium ion electrolytic solution 19. Accordingly, the lithium-ion supercapacitor using the graphene/CNT composite electrode having a high energy density and a high power density, being capable of being charged and discharged many times, and having a long product life can be easily manufactured.

The lithium-ion supercapacitor using the graphene/CNT composite electrode and the manufacturing method thereof of the present invention are not limited to the embodiment described above, of course, but various modifications may be employed therein within the range of the technical idea of the present invention. Embodiments of the present invention will be described below. However, the present invention is not limited to such examples.

EXAMPLES

Example 1

(Graphene Synthesizing Process: Composition of Graphene Oxide)

As described below, graphene oxide was synthesized from graphite using the modified Hummer's method.

First, graphite and $NaNO_3$ were mixed inside a flask, and, after 100 ml of $H_2SO_4$ (95%) was added, the suspension was agitated using an ice bath. When the suspension was overheated, 8 g of potassium permanganate was slowly added to the suspension, and the mixture was agitated inside a flask for two hours, and as a result, the mixture exhibited a bright brown color.

Next, 90 ml of distilled water was added and agitated, and a yellow suspension was formed. An ultrasonic treatment was performed for the yellow suspension. Accordingly, graphene oxide pieces were stripped from graphite oxide particles.

Centrifugation was performed, whereby large particles are eliminated. Thereafter, a vacuum drying process was performed. Accordingly, graphene oxide formed by dark brown powers having a size of about 10 μm was acquired.

In the way described above, the graphene oxide was synthesized.

(Graphene Synthesizing Process: Reduction of Graphene Oxide)

100 mg of the graphene oxide particles were dispersed in 30 ml of distilled water, and an ultrasonic treatment was performed for 30 minutes, whereby a suspension was prepared. This suspension was slowly heated on a hot plate so as to be at 100° C.

Next, 3 ml of hydrazine hydrate (hydrazine monohydrate) was added, and then, the suspension was maintained at 98° C. for 24 hours. Thereafter, the suspension was filtered, whereby black powders were collected.

The obtained black powders were washed using distilled water several times, and, after excessive hydrazine was eliminated, again, resultant powders were dispersed into water, and an ultrasonic treatment was performed for the powders, whereby a suspension was prepared. This suspension was centrifuged at the condition of 4,000 rpm for three minutes, and the suspension was vacuum-filtered, whereby powders were collected.

A vacuum drying treatment is performed for the powders, whereby a final graphene product was acquired.

In the way described above, graphene was synthesized.
(Generation of Graphene/CNT Composite)

As the single-walled carbon nano tube (SWCNT), a commercial product (Cheap Tube. Inc., >90%, amorphous carbon content 3 wt %, length: 5 to 30 mm, diameter: 1 to 2 nm) was prepared.

This carbon nano tube was used without performing any treatment.

First, graphene and SWCNTs were weighed at the mass ratio of 4:1, and are mixed in ethanol, and an ultrasonic treatment was performed for the mixture, whereby a suspension was prepared. Next, the suspension was vacuum-filtered by using a micro porous filter, whereby a film-like object was acquired.

This film-like object was dried, and the dried film-like object was cut out into a circular shape having a diameter of 15 mm in accordance with the shape of the cathode.

In the way described above, a graphene/CNT composite having a film shape was generated.
(Manufacturing of Capacitor)
(Production of Half-Cell Type lithium-ion supercapacitor)

Figure 7:
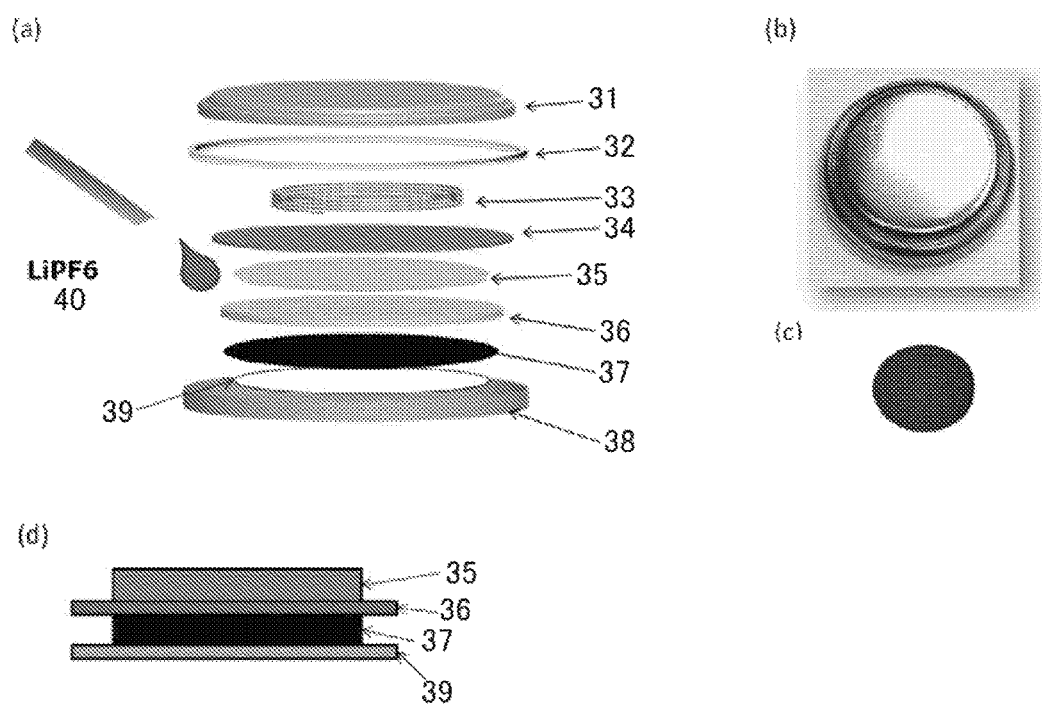
FIGS. 7(a) to 7(d) are explanatory diagrams of a half-cell type lithium-ion supercapacitor and respectively are an obliquely-viewing development (a) of a coin cell including a half-cell type lithium-ion supercapacitor produced in this example, an optical photograph (b) of the coin cell, a photograph (c) of a graphene/CNT composite having a film shape, and a structure diagram (d) of the half-cell type lithium-ion supercapacitor.

FIGS. 7(*a*) to 7(*d*) are explanatory diagrams of a half-cell type lithium-ion supercapacitor and respectively are an obliquely-viewing development (a) of a coin cell including a half-cell type lithium-ion supercapacitor, an optical photograph (b) of the coin cell, a photograph (c) of a graphene/CNT composite having a film shape, and a structure diagram (d) of the half-cell type lithium-ion supercapacitor.

As illustrated in FIG. 7(*a*), a coin cell cap 31, a circle-shaped gasket 32, a spring 33, a steel spacer 34, an anode 35, a separator 36, a cathode 37, a current collector (made from Al) 39, and a coin cell case 38 were arranged to overlap each other in the mentioned order, a space between the anode 35 and the cathode 32 was filled with a lithium ion electrolytic solution 40, and the coin cell cap 31 was fitted to the coin cell case 38 so as to be fixed, whereby the coin cell was manufactured.

FIG. 7(*b*) illustrates an optical photograph taken from the upper side of the slope of the coin cell cap.

FIG. 7(*c*) illustrates a film-like graphene/CNT composite that has a circle shape in the plan view.

In this half-cell type lithium-ion supercapacitor, the film-like graphene/CNT composite was used as the cathode 37. In addition, a lithium foil was used as the anode 35. A cell guard 2400 was used as the separator 36.

A solution acquired by dissolving 1 mol/L of $LiPF_6$ into an organic solvent acquired by mixing ethylene carbonate (EC) and diethyl carbonate (DEC) at the ratio of 1:1 (v/v) was used for the filling as the lithium ion electrolytic solution 40.

As illustrated in FIG. 7(d), the Li foil as the anode 35 was configured to be directly brought into contact with the steel spacer without the current collector.

In the way described above, the coin cell (Example 1) in which the half-cell type lithium-ion supercapacitor was stored was manufactured.

(CV Measurement)

By using the coin cell described above, cyclic voltammetry (CV) was measured at scanning speeds having mutually-different ranges of 5, 10, and 20 mV/s with potential in the range of 2 to 4 V.

Figure 8:
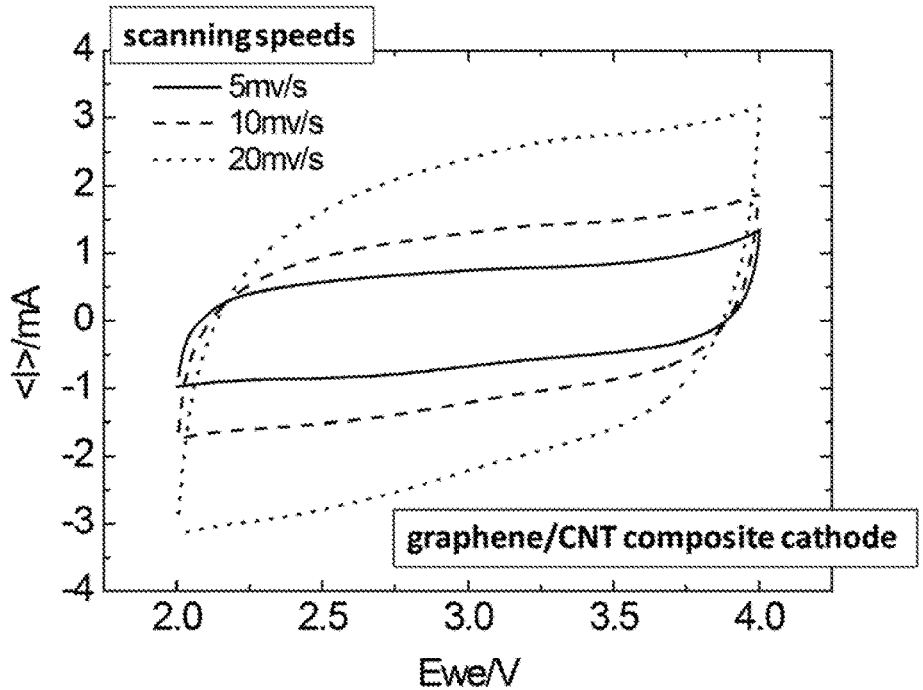
FIG. 8 is a CV curve of the coin cell (Example 1).

FIG. 8 is a CV curve of the measured coin cell.

The CV curve had an almost rectangular shape, and the capacitance (static capacitance) calculated based on the area of the CV curve was high. In a case where the scanning speed was increased, a deviation considered to be due to the Li insertion/no-insertion process was increased.

(Charge/Discharge Measurement)

Next, by using the coin cell, charge/discharge at current densities of the lithium-ion supercapacitor of 0.05 A/g, 0.12 A/g, 0.64 A/g, and 1.28 A/g was measured.

Figure 9:
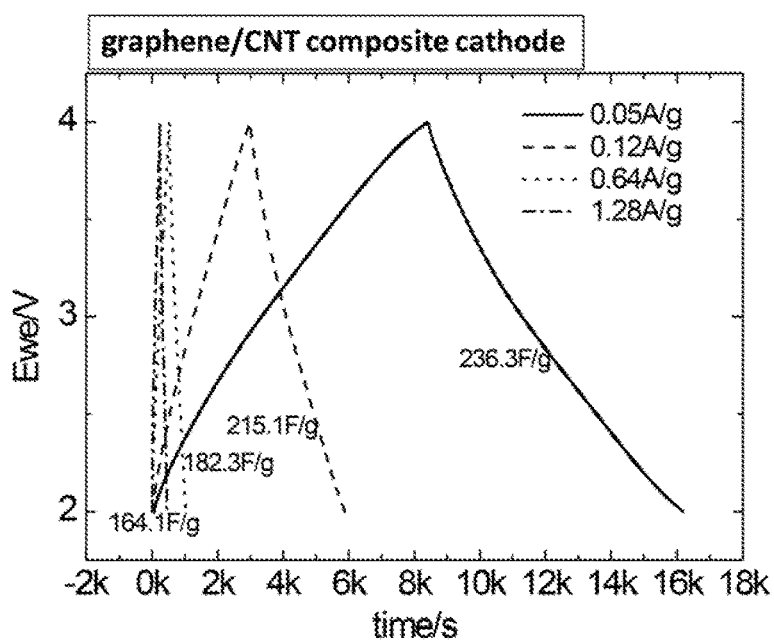
FIG. 9 is a charge/discharge profile.

FIG. 9 is a charge/discharge profile. Based on this charge/discharge profile, the capacitance C (static capacitance) was calculated, and by substituting C in the following Equation (1), the static capacitance $C_{cell}$ of the cell was calculated.

[Mathematical Formula 1]

$$C_{cell}=(1/2)C \qquad (1)$$

Next, by substituting $C_{cell}$, a minimum voltage $V_1$ and a maximum voltage $V_2$ in the following Equation (2), the energy density E was calculated.

[Mathematical Formula 2]

$$E=(1/2)C_{cell}(V_2^2-V_1^2)(1/3.6) \qquad (2)$$

When the current density was 0.05 A/g, the static capacitance was 236 F/g. This value was quite larger than 194.6 F/g of graphene.

Figure 10:
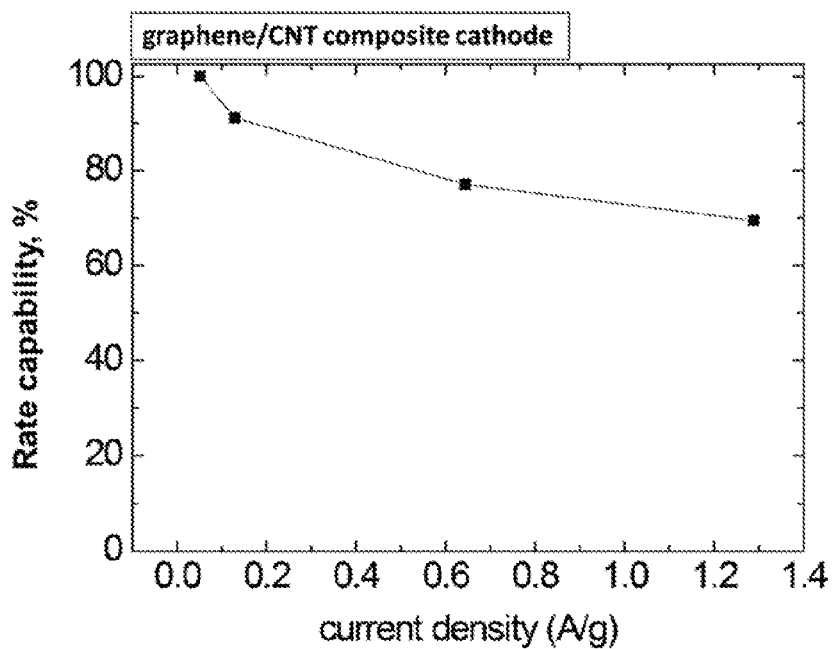
FIG. 10 is a graph that illustrates the dependency of a rate capability on the current density.

FIG. 10 is a graph that illustrates the dependency of a rate capability on the current density. As the current density was raised, the rate capability was decreased and maintained approximately 70% at a current density of 1.2 A/g.

(EIS Measurement)

Next, the electrochemical impedance spectroscopy (EIS) of the coin cell (Example 1) was measured.

The measurement of the impedance was performed in the frequency range of 10 kHz to 0.1 Hz without DC bias of a sinusoidal function signal of 0.005 V.

Figure 11:
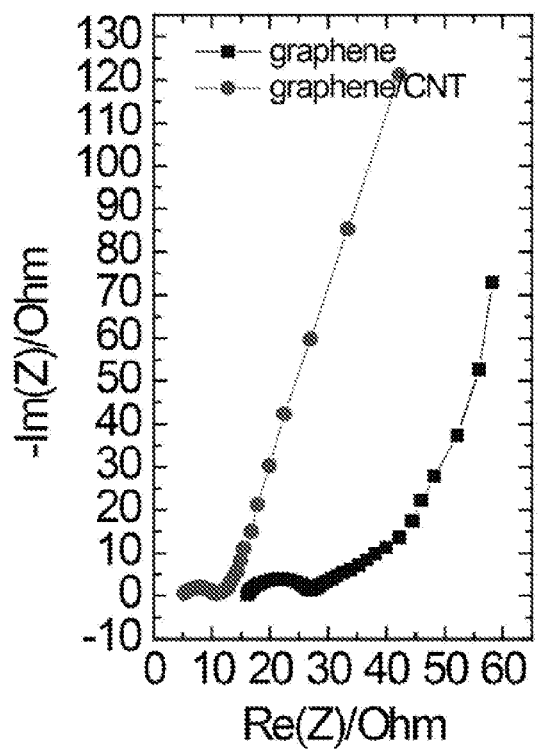
FIG. 11 is a graph that illustrates a measurement result of the EIS of the coin cell (Example 1).

FIG. 11 is a graph that illustrates a measurement result of the EIS of the coin cell (Example 1). For a comparison, a result (Comparative Example 1) of only graphene was also illustrated.

Comparative Example 1

A coin cell (Comparative Example 1) storing a half-cell type lithium ion capacitor was produced similarly to Example 1 except that a film-like graphene was generated using a known method and was used as a cathode.

Figure 12:
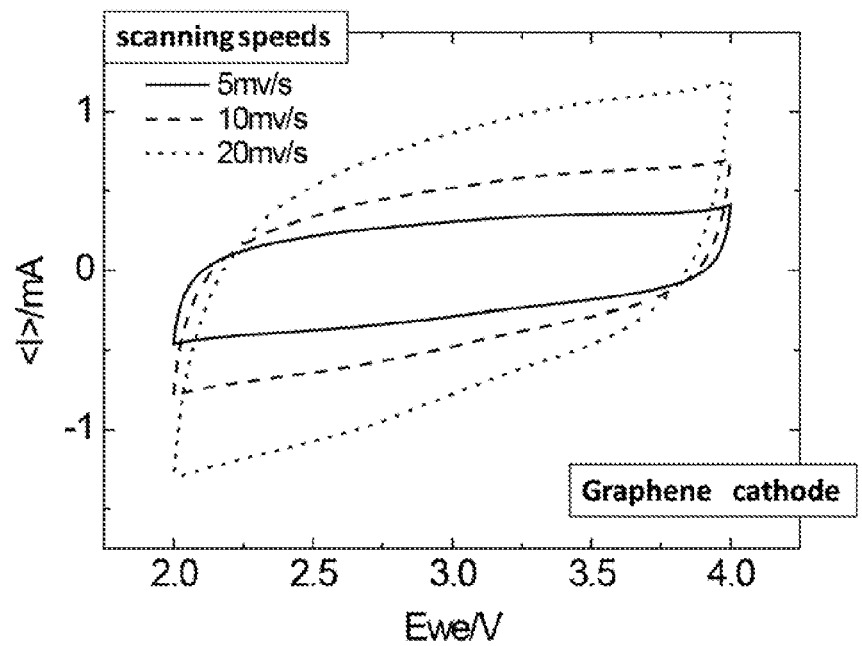
FIG. 12 is a CV curve of a coin cell (Comparative Example 1).

First, CV was measured at scanning speeds having mutually-different ranges of 5, 10, and 20 mV/s with potential in the range of 2 to 4 V. FIG. 12 is a CV curve of the coin cell (Comparative Example 1). The current was smaller by about ⅓ times than that of the coin cell (Example 1).

Figure 13:
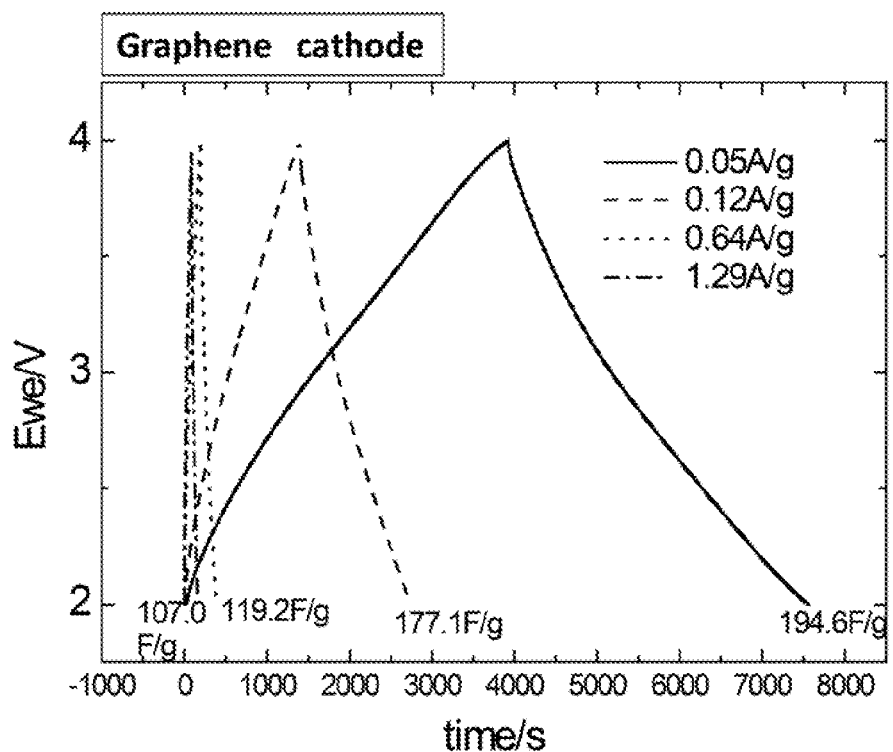
FIG. 13 is a charge/discharge profile of the coin cell (Comparative Example 1).

Next, the charge/discharge of the coin cell (Comparative Example 1) was measured. FIG. 13 is a charge/discharge profile of the coin cell (Comparative Example 1).

Based on this charge/discharge profile, the capacitance (static capacitance) was calculated. When the current density was 0.05 A/g, the static capacitance was 194.6 F/g.

Example 2

A coin cell (Example 2) storing a half-cell type lithium ion capacitor was produced similarly to Example 1 except that graphene and SWCNTs were weighed at a mass ratio of 3:1, and a graphene/CNT composite having a concentration of the CNTs of 25 wt % was generated.

Example 3

A coin cell (Example 3) storing a half-cell type lithium ion capacitor was produced similarly to Example 1 except that graphene and SWCNTs were weighed at a mass ratio of 2:1, and a graphene/CNT composite having a concentration of the CNTs of 33 wt % was generated.

Example 4

A coin cell (Example 4) storing a half-cell type lithium ion capacitor was produced similarly to Example 1 except that graphene and SWCNTs were weighed at a mass ratio of 5:1, and a graphene/CNT composite having a concentration of the CNTs of 17 wt % was generated.

Comparative Example 2

A coin cell (Comparative Example 2) storing a half-cell type lithium ion capacitor was produced similarly to Example 1 except that graphene and SWCNTs were weighed at a mass ratio of 1:1, and a graphene/CNT composite having a concentration of the CNTs of 50 wt % was generated.

Comparative Example 3

A coin cell (Comparative Example 3) storing a half-cell type lithium ion capacitor was produced similarly to Example 1 except that a film-like SWCNT was used as a cathode.

Example 5

A coin cell (Example 5) storing a half-cell type lithium ion capacitor was produced similarly to Example 1 except that a glass fabric separator was used.

First, CV was measured at scanning speeds having mutually-different ranges of 5, 10, and 20 mV/s with potential in the range of 2 to 4 V.

Figure 14:
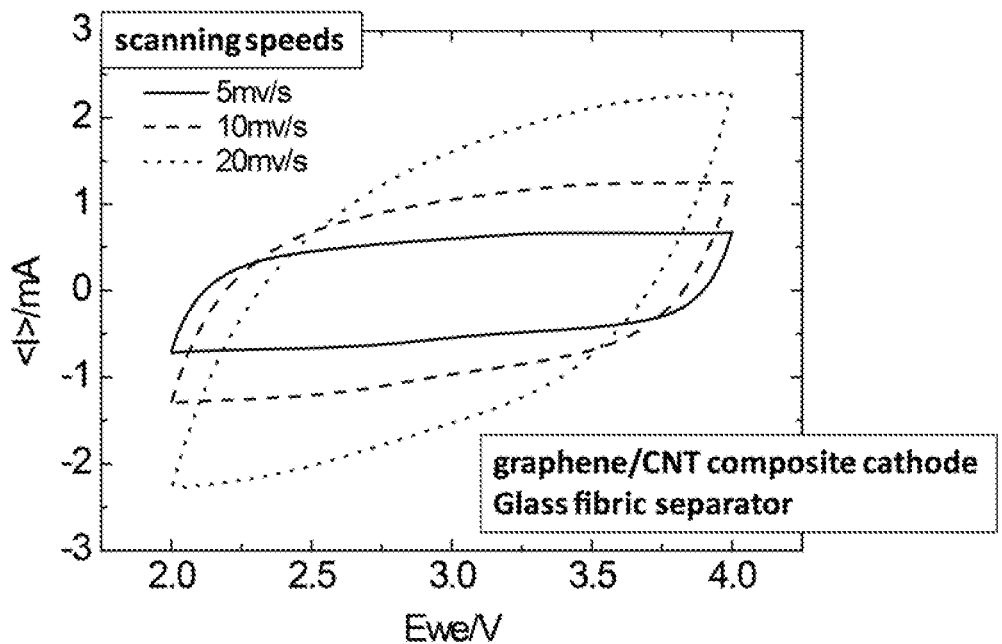
FIG. 14 is a CV curve of a coin cell (Example 5).

FIG. 14 is a CV curve of the coin cell (Example 5).

Next, the charge/discharge of the coin cell (Example 5) was measured.

ited the best performance of all the data. More specifically, the power density was 89 W/kg, and the energy density was 177 Wh/kg.

Table 1 illustrates the type of produced device, the type of separator, the type of cathode, the composition ratio, the CV characteristic, the charge/discharge characteristic, the coulomb efficiency, the power density, and the energy density.

TABLE 1

|  | Device | Separator | Anode Type | Cathode Type | G (g) | CNT (g) | CNT (wt %) | CV (mA) at 3.0 V | Charge-Discharge (F/g) 0.05 A/g | Charge-Discharge (F/g) 0.12 A/g |
|---|---|---|---|---|---|---|---|---|---|---|
| Comparative Example 1 | LIC | Celgard | Li Foil | G | — | — | 0% | 0.8 | 194.6 | 177.1 |
| Example 1 | LIC | Celgard | Li Foil | G/CNT | 4 | 1 | 20% | 2.4 | 236.3 | 215.1 |
| Example 2 | LIC | Celgard | Li Foil | G/CNT | 3 | 1 | 25% | 2.1 | 222.1 | 200.5 |
| Example 3 | LIC | Celgard | Li Foil | G/CNT | 2 | 1 | 33% | 1.5 | 208.6 | 185.4 |
| Example 4 | LIC | Celgard | Li Foil | G/CNT | 5 | 1 | 17% | — | — | — |
| Comparative Example 2 | LIC | Celgard | Li Foil | G/CNT | 1 | 1 | 50% | 0.6 | 180.5 | 160.8 |
| Comparative Example 3 | LIC | Celgard | Li Foil | CNT | — | — | 100% | 0.08 | 9.2 | 8.1 |
| Example 5 | LIC | glass fiber | Li Foil | G/CNT | 4 | 1 | 25% | — | 212.5 | 191.1 |
| Comparative Example 4 | LIC | Celgard | Li Foil | AC | — | — | — | — | — | — |
| Comparative Example 5 | EDLC | Celgard | AC (Porous carbon) | AC (Porous carbon) | — | — | — | — | — | — |

|  | Charge-Discharge (F/g) 0.64 A/g | Charge-Discharge (F/g) 1.28 A/g | rate capability (%) 0 A/g | rate capability (%) 0.1 A/g | rate capability (%) 0.6 A/g | rate capability (%) 1.3 A/G | Power density (W/kg) | Energy density (Wh/kg) |
|---|---|---|---|---|---|---|---|---|
| Comparative Example 1 | 119.2 | 107 | — | — | — | — | 1500 | 70 |
| Example 1 | 182.3 | 164.1 | 100 | 90 | 75 | 70 | 2000 | 196.9 |
| Example 2 | 159.3 | 142.7 | 100 | 90 | 72 | 64 | 1900 | 185.1 |
| Example 3 | 131.2 | 123.9 | 100 | 89 | 63 | 59 | 1800 | 173.8 |
| Example 4 | — | — | — | — | — | — | — | — |
| Comparative Example 2 | 101.5 | 97.1 | 100 | 89 | 56 | 54 | 1600 | 150.4 |
| Comparative Example 3 | 6.8 | 6.1 | 100 | 88 | 74 | 66 | 80 | 7.7 |
| Example 5 | 155 | 136.5 | — | — | — | — | — | 177.1 |
| Comparative Example 4 | — | — | — | — | — | — | 300 | 50 |
| Comparative Example 5 | — | — | — | — | — | — | 5000 | 4 |

Figure 15:
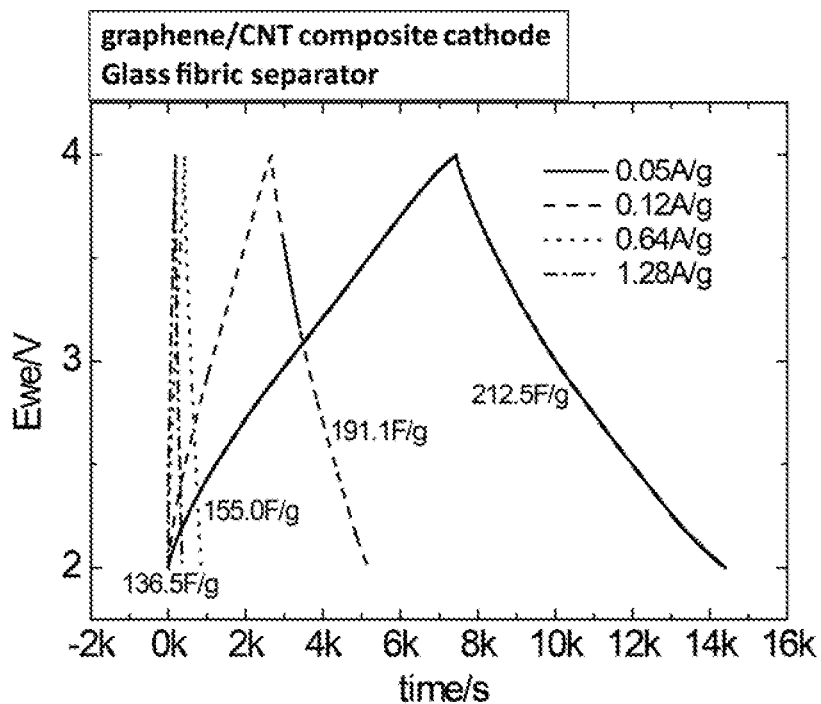
FIG. 15 is a charge/discharge profile of the coin cell (Example 5).

FIG. 15 is a charge/discharge profile of the coin cell (Example 5).

Comparative Example 4

A coin cell (Comparative Example 4) storing a half-cell type lithium ion capacitor was produced similarly to Example 1 except that an AC was used as a cathode.

Comparative Example 5

A coin cell (Comparative Example 5) storing an EDLC was produced similarly to Example 1 except that an AC was used as an anode, and an AC was used as a cathode.

Figure 16:
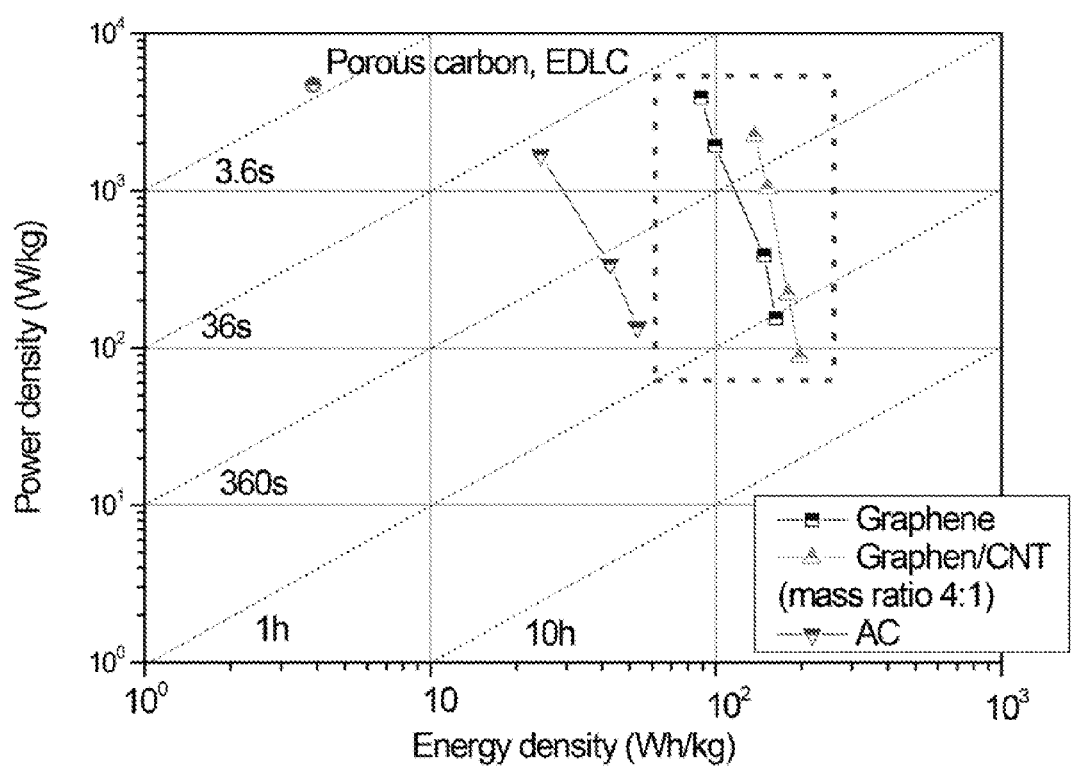
FIG. 16 illustrates Ragone plots.

Here, Ragone plots are illustrated in FIG. 16.

Results of the coin cell (Example 1: the graphene/CNT composite cathode), the coin cell (Comparative Example 1: graphene cathode), the EDLC (porous carbon), and the coin cell (AC) are illustrated (Non Patent Literature 14).

The power density and the energy density of the coin cell (Example 1: the graphene/CNT composite cathode) exhib- Example 6

(Production of Full-Cell Type lithium-ion Supercapacitor)

Figure 17:
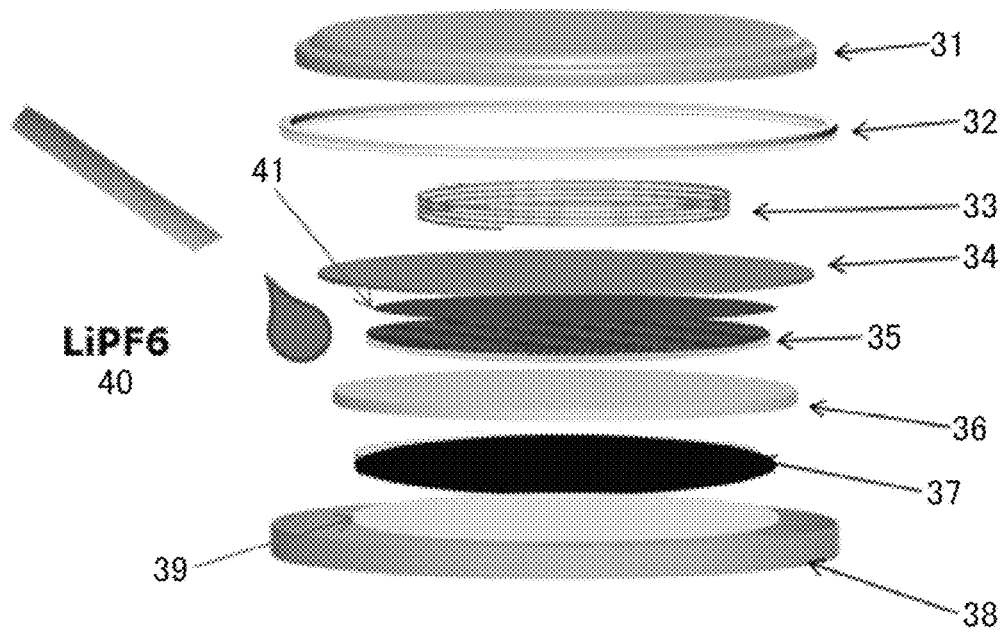
FIGS. 17(a) and 17(b) are explanatory diagrams of a full-cell type lithium-ion supercapacitor and are an obliquely-viewing development (a) of a coin cell including a full-cell type lithium-ion supercapacitor produced in this example and a structural diagram (b) of the full-cell type lithium-ion supercapacitor.
Figure 17:
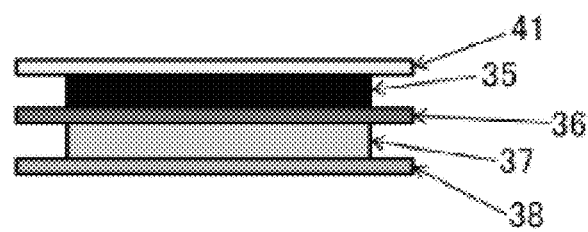

FIGS. 17(a) and 17(b) are explanatory diagrams of a full-cell type lithium-ion supercapacitor and illustrate an obliquely-viewing development (a) of a coin cell including a full-cell type lithium-ion supercapacitor produced in this example and a structural diagram (b) of the full-cell type lithium-ion supercapacitor.

A configuration similar to Example 1 (FIGS. 7(a) to 7(d)) except that hard carbon is used as the anode 35, and a current collector (made of Cu) 41 is arranged between the steel spacer 34 and the anode 35 is employed.

Figure 18:
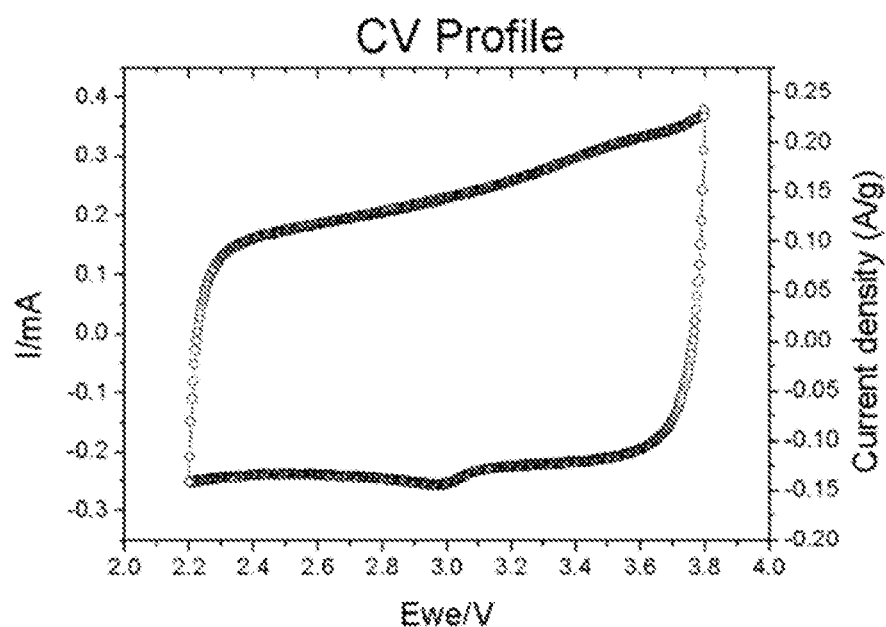
FIG. 18 is a CV curve of a coin cell (Example 6).

FIG. 18 is a CV curve of the coin cell (Example 6).

Figure 19:
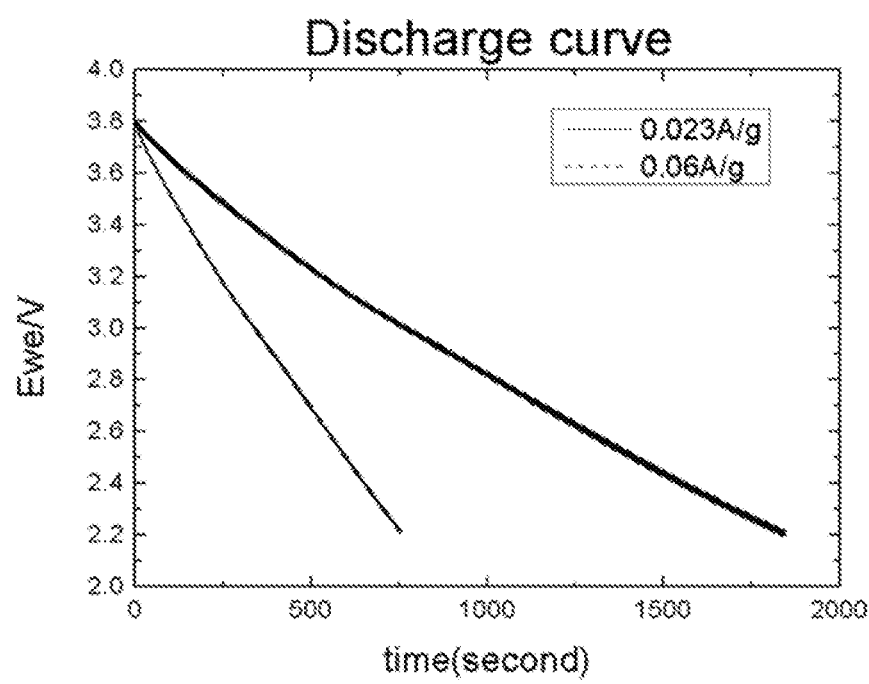
FIG. 19 is a discharge profile of the coin cell (Example 6).

FIG. 19 is a discharge profile of the coin cell (Example 6).

(Measurement of Pore)

Figure 20:
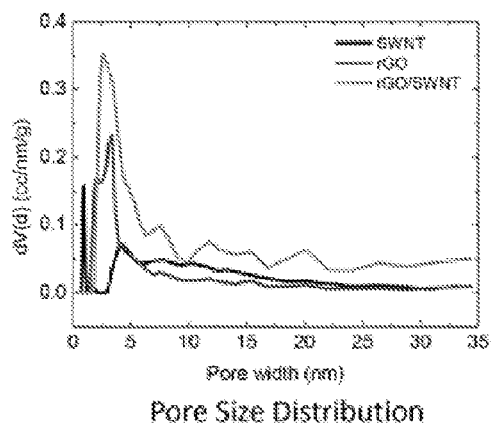
FIG. 20 illustrates graphs that illustrate a pore size and a surface area distribution of CNT/graphene (reduced graphene oxide: abbreviated to rGO).
Figure 20:
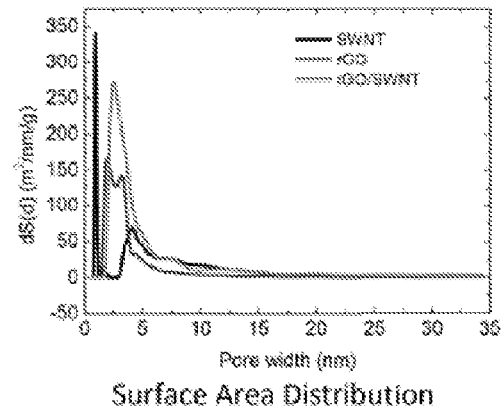

FIG. 20 illustrates graphs that illustrate a pore size and a surface area distribution of CNT/graphene (reduced graphene oxide: abbreviated to rGO). A ratio among micropores (less than 2 nm), mesopores (2 nm or more and 50 nm or less), and macropores (over 50 nm) is illustrated in the following Table 2. BET SSA represents a BET specific surface area. In addition, CRGO is an abbreviation of chemical reduced GO and has the same meaning as rGO. Only SWNT collectively represents a case of only rGO.

TABLE 2

| | Microspore % | Mesopore % | Macropore % | BETSSA $m^2/g$ | Micropore $m^2/g$ | Mesopore $m^2/g$ | Macropore $m^2/g$ |
|---|---|---|---|---|---|---|---|
| SWNT | 18.2% | 79.8% | 2.0% | 456 | 83.0 | 363.9 | 9.1 |
| CRGO | 18.2% | 77.9% | 3.9% | 592 | 107.7 | 461.2 | 73.1 |
| CRGO/SWNT | 2.7% | 87.3% | 10.0% | 945 | 25.5 | 825.0 | 94.5 |

Example 7

(Generation of graphene/CNT Composite)

Similar to Example 1, a film-like graphene/CNT composite was generated.

(Manufacturing of Capacitor)
(Production of Half-Cell Type lithium-ion Supercapacitor)

Similar to the configuration of Example 1, a half-cell type coin cell (Example 7) was produced.

This coin cell includes a half-cell type lithium-ion supercapacitor. In this half-cell type lithium-ion supercapacitor, the film-like graphene/CNT composite was used as the cathode 37 in FIGS. 7(a) to 7(d), and a lithium foil was used as the anode 35 in FIGS. 7(a) to 7(d). A solution acquired by dissolving 1 mol/L of LiPF$_6$ into an organic solvent acquired by mixing ethylene carbonate (EC) and diethyl carbonate (DEC) at the ratio of 1:1 (v/v) was used for the filling as the lithium ion electrolytic solution 40 in FIGS. 7(a) to 7(d).

(CV Measurement)

First, by using the coin cell (Example 7), cyclic voltammetry (CV) was measured at scanning speeds having mutually-different ranges of 5, 10, and 20 mV/s with potential in the range of 0 to 3 V. This represents the anode characteristic.

Figure 21:
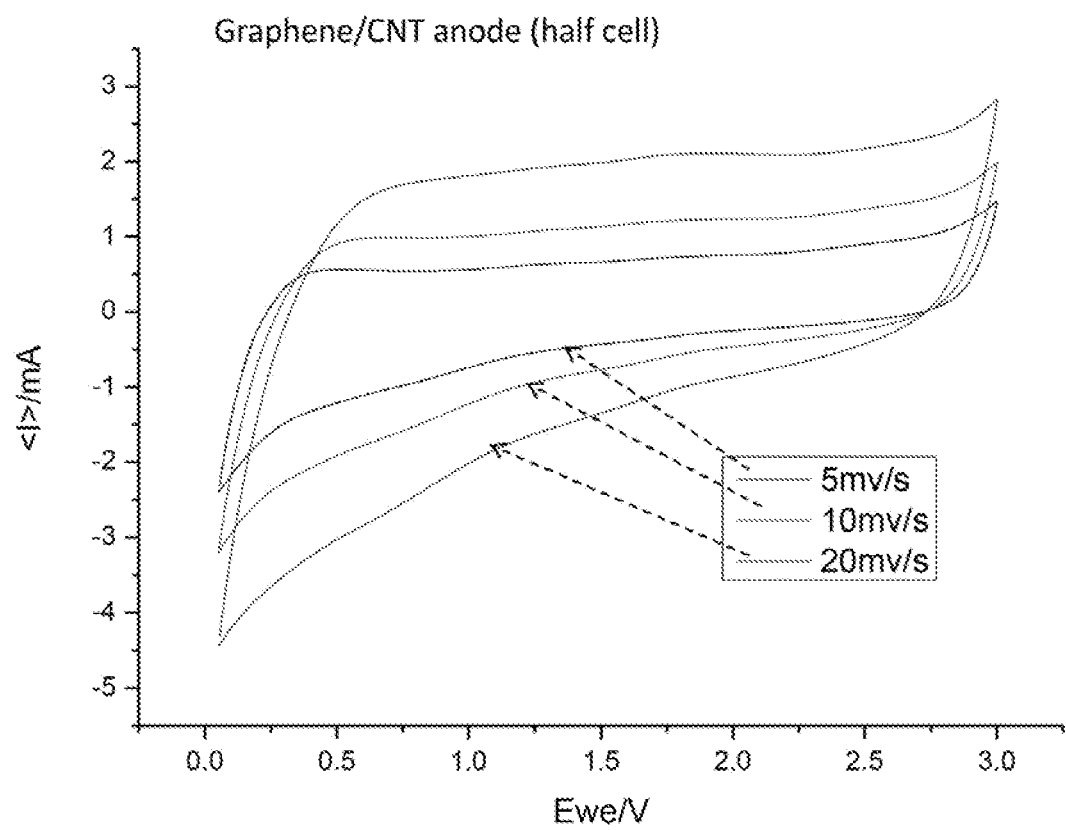
FIG. 21 is a CV curve of a coin cell (Example 7).

FIG. 21 is a CV curve of the coin cell (Example 7).

The CV curve had an almost trapezoidal shape, and the capacitance (static capacitance) was calculated based on the area of the CV curve. In a case where the scanning speed was increased, the area increased.

Near 0 V, a Redox peak was acquired. Here, it is considered that intercalation occurred.

(Charge/Discharge Measurement)

Next, by using the coin cell (Example 7), charge/discharge at current densities of the lithium-ion supercapacitor of 0.05 A/g was measured. The charge/discharge was repeated from the 1st to the 6th.

Figure 22:
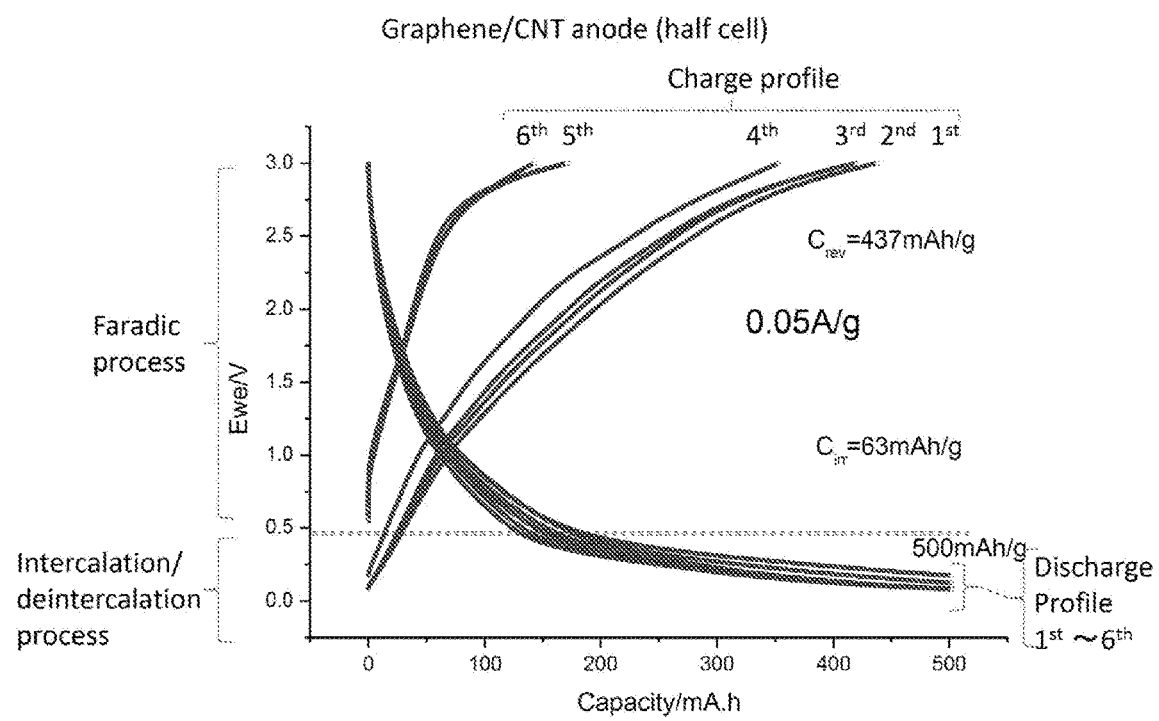
FIG. 22 is a charge/discharge profile.

FIG. 22 is a charge/discharge profile. A relation between the capacity and Ew is represented.

Crev=437 mAh/g, and Cirr=63 mAh/g. The irreversible capacity loss was small, and the coulomb efficiency was high.

Based on the discharge profile, it was considered that, in an area of 0.5 V or more and 3 V or less, while a voltage drop was rapid, and a Faraday process in which lithium ions are adsorbed onto the electrode was dominant, in an area of 0 V or more and 0.5 V or less, the intercalation/de-intercalation of lithium ions of the electrode toward the graphene/CNT composite was dominant.

In the graphene/CNT composite, the CNT serves as a spacer, and, as an Li intercalation site, a porous structure including nano pores that are electrochemically active is formed, and a graphene layer is separated. According, lithium ions can be easily and sufficiently intercalated for the activation face of graphene.

According to an anode reaction, for example, a graphite-intercalated compound having LiC$_3$ as its main product is formed. The capacity of this compound is 372×2=744 mAh/g that is close to twice a theoretical value of the capacity of the graphite, and accordingly, the capacity can be increased.

Comparison of Anode Materials of Rate Capability)

Next, a graph representing a relation between the capacitance and the current relating to a comparison of rate capabilities among anode materials was generated based on data according to a similar measurement at the time of changing the data and the current value illustrated in FIG. 22.

Figure 23:
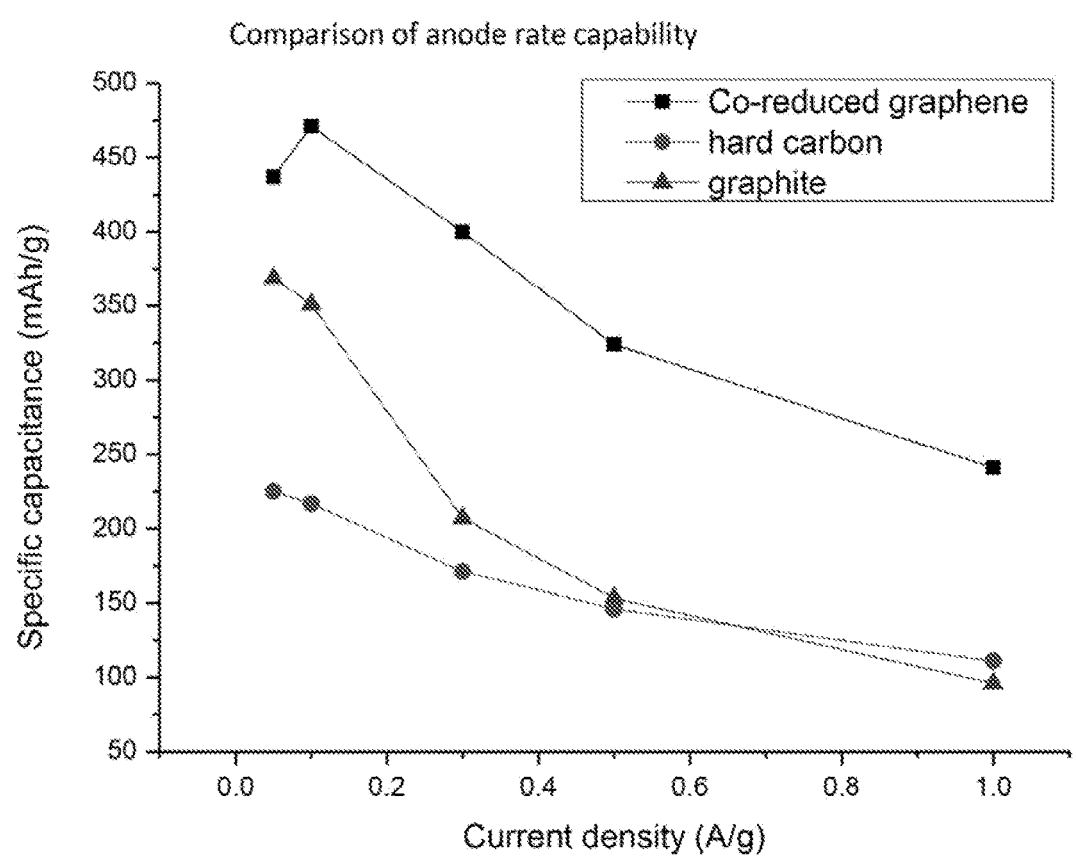
FIG. 23 illustrates graphs that illustrate relations between the capacitance and the current relating to a comparison of rate capabilities among anode materials.

FIG. 23 illustrates graphs that illustrate relations between the capacitance and the current relating to a comparison of rate capabilities among anode materials. A graphene/CNT composite used for the anode is represented as co-reduced graphene. For comparison, results of cases where hard carbon and graphite were used for the anode are illustrated as well.

Next, based on the data represented in FIG. 23, the rate capability was calculated using the following equation. Here, C (Imax) is capacitance at the time of a maximum current value, and C (Imin) is capacitance at the time of a minimum current.

[Mathematical Formula 3]

$$\text{Rate Capability} = \frac{C(I_{max}) - C(I_{min})}{C(I_{min})} \times 100\% \quad (3)$$

Further, based on the data represented in FIG. 22, an irreversible capacity loss was calculated using the following equation. Here, C (discharge) is a minimum capacity of the discharge profile, and C (charge) is a maximum capacity of the charge profile.

[Mathematical Formula 4]

$$\text{irrevisle capacity loss} = \frac{C(\text{discharge}) - C(\text{charge})}{C(\text{charge})} \times 100\% \quad (4)$$

Figure 24:
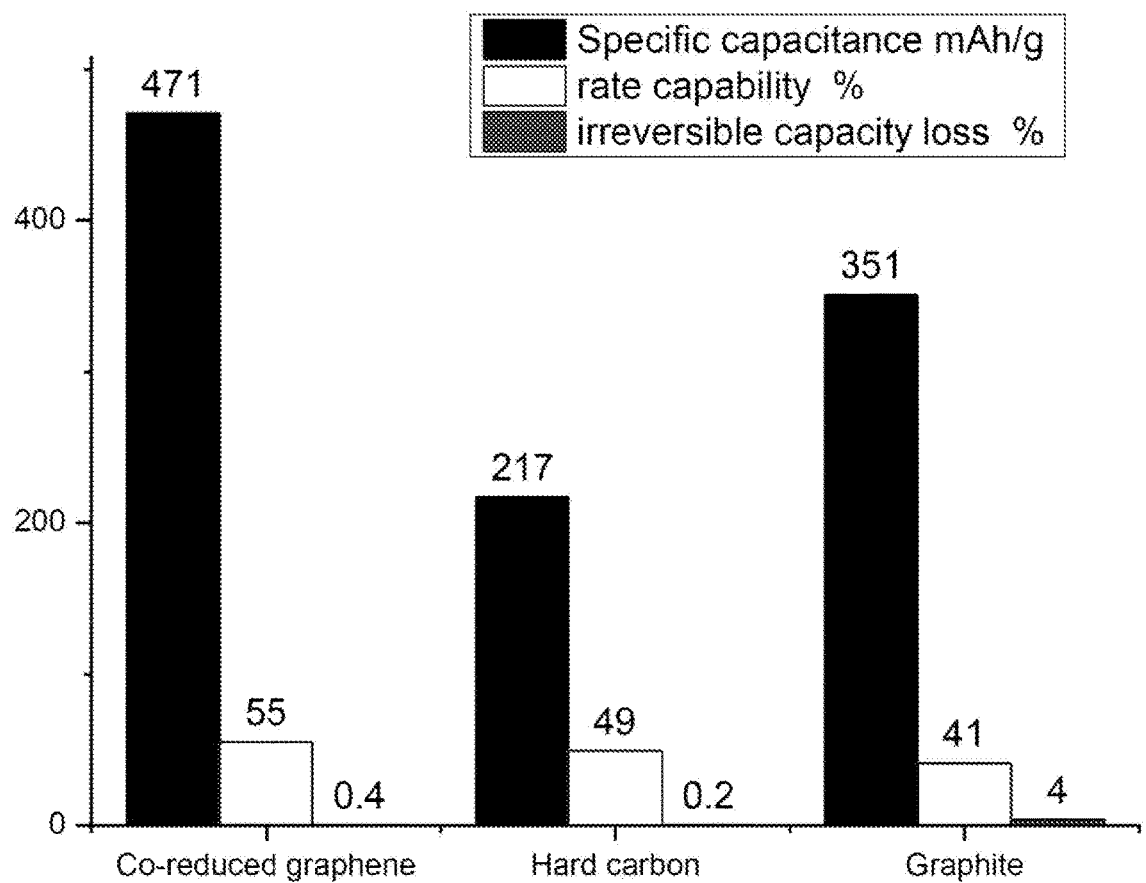
FIG. 24 is a bar graph that illustrates a relation among specific capacitance, a rate capability, and an irreversible capacity loss.

FIG. 24 is a bar graph that illustrates a relation among specific capacitance, a rate capability, and an irreversible capacity loss.

From this FIG. 24, it can be understood that the anode using the graphene/CNT composite exhibits a rate capability higher than those of the other two types of carbon, in other words, hard carbon and graphite. This represents that Li is intercalated into the graphene/CNT or de-intercalated from the graphene/CNT sufficiently efficiently. Such a capability assures the excellent rate capability and the stability of the LIC including the graphene/CNT as an anode.

(Pre-doping for Anode Electrode)

By using an electrochemical (EC) method or an external short circuit (ESC) method, inside an electrolytic solution of 1 mol LiPF$_6$ (EC/DEC (v:v=1:1)), in a configuration including a lithium metal electrode as a lithium ion source, lithium ion pre-doping was performed for a graphite anode.

Figure 25:
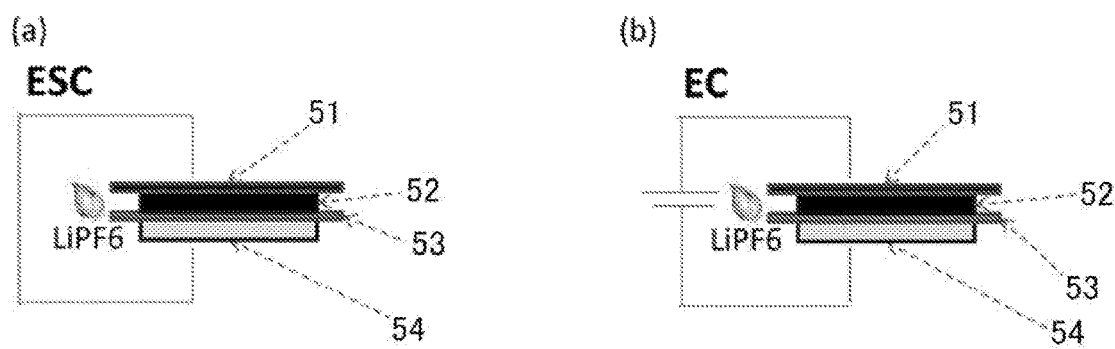
FIGS. 25(a) and 25(b) are device explanatory diagrams and respectively are explanatory diagrams of an ESC method (a) and an EC method (b).

FIGS. 25(a) and 25(b) are device explanatory diagrams and respectively are explanatory diagrams of an ESC method (a) and an EC method (b). In the configuration of the device, a current collector 51, graphene 52, a separator 53, and Lithium 54 are stacked, and a lithium ion electrolytic solution 55 is added.

(Charge/Discharge Measurement)

Next, by using the coin cell, charge/discharge of the lithium-ion supercapacitor was measured for 2 to 4 V.

Figure 29:
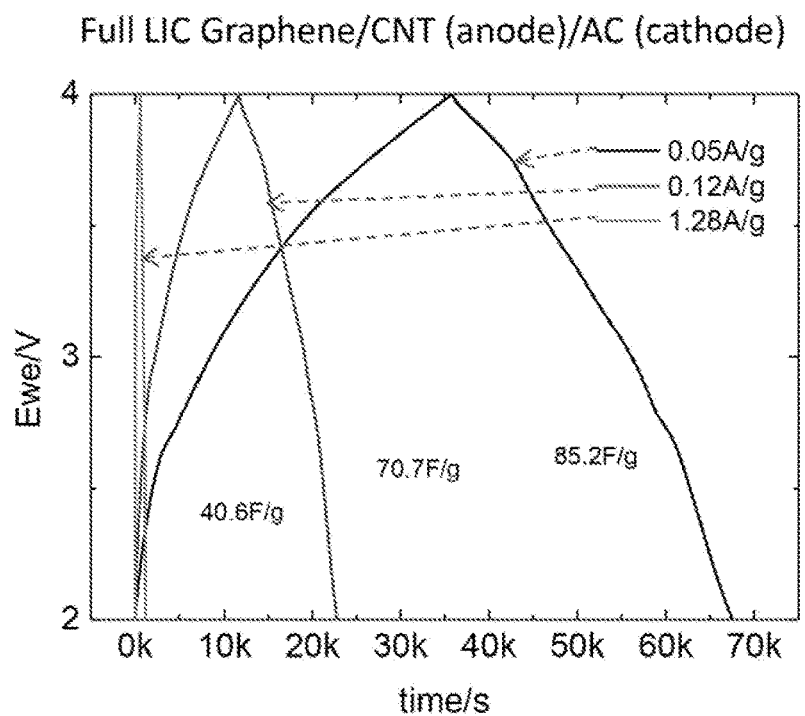
FIG. 29 is a charge/discharge profile of the coin cell (Example 8).

FIG. 29 is a charge/discharge profile of the coin cell (Example 8). For current densities of 0.05 A/g, 0.12 A/g, and 1.28 A/g, the capacities were respectively 40.6 F/g, 70.7 F/g, 85.2 F/g.

The results acquired as above are summarized in Table 3.

Table 3 is a comparison of the characteristics of lithium-ion supercapacitors. Here, MCMB is an abbreviation of mesocarbon microbead. In addition, $H_2O_2$ modified MCMB is an MCMB treated by $H_2O_2$. LTO is an abbreviation of lithium titanium oxide.

In addition, a packaged cell energy density is an energy density of all the cells.

TABLE 3

| Cathode(+) | Anode(−) | Specific Capacitance (F/g) | Active Material Energy density (Wh/kg) | packaged cell energy density (Wh/kg) | Operation voltage (V) | Current density (A/g) |
|---|---|---|---|---|---|---|
| Activated carbon | predoped graphene/CNT | 85.2 | 35.5 | 10.7 | 2~4 | 0.05 |
| Activated carbon | predoped graphene | 72.7 | 30.2 | 9 | 2~4 | 0.05 |
| Activated carbon | predoped graphite | 70.1 | 29.2 | 8.8 | 2~4 | 0.05 |
| Activated carbon | predoped MCMB | 65.6 | 27.3 | 8.2 | 2~4 | 0.05 |
| Activated carbon | predoped Hard carbon | 52.4 | 21.8 | 6.6 | 2~4 | 0.05 |
| graphene/CNT | Li | 284 | 118 | 35.5 | 2~4 | 0.05 |
| graphene/CNT | graphene/CNT | 197.6 | 50 | 15 | 2.7 | 0.03 |
| graphene/CNT | predoped graphite | 242.2 | 101 | 30.3 | 2~4 | 0.03 |
| graphene/CNT | $H_2O_2$ modified MCMB | 226.2 | 94.3 | 28.3 | 2~4 | 0.03 |
| graphene/CNT | LTO/CNT | 163.4 | 90.8 | 27.2 | 0~4 | 0.03 |
| graphene/CNT | predoped graphene/CNT | 274 | 114 | 34 | 2~4 | 0.05 |

In the EC method, lithium 54 and the current collector 51 are brought into contact with each other through a wiring.

In the ESC method, a wiring is connected to a power source.

Figure 26:
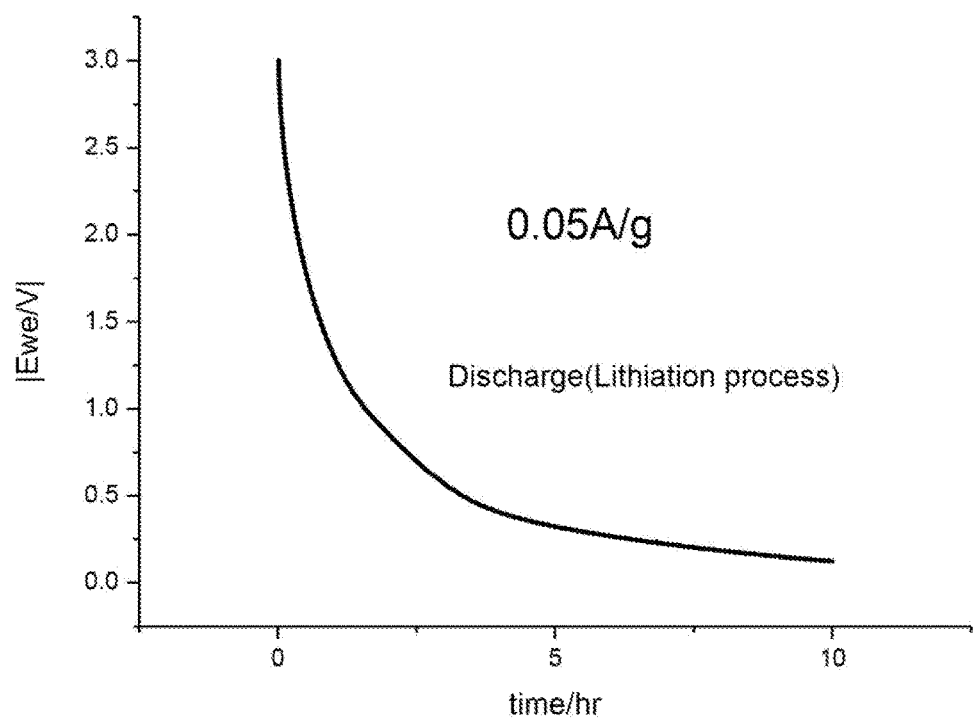
FIG. 26 is a discharge profile according to the EC method for a current density of 0.05 A/g.

FIG. 26 is a discharge profile according to the EC method for a current density of 0.05 A/g. A lithiation process was seen. The lithiation process is a process in which a compound formed by lithium and an anode element is formed by doping lithium into an anode material. For example, by doping lithium into a carbonized material, LiC$_X$ is formed.

Example 8

(Production of Full-Cell Type lithium-ion supercapacitor)

The full-cell type lithium-ion supercapacitor as in Example 6 of FIGS. 17(a) and 17(b) was produced.

Figure 27:
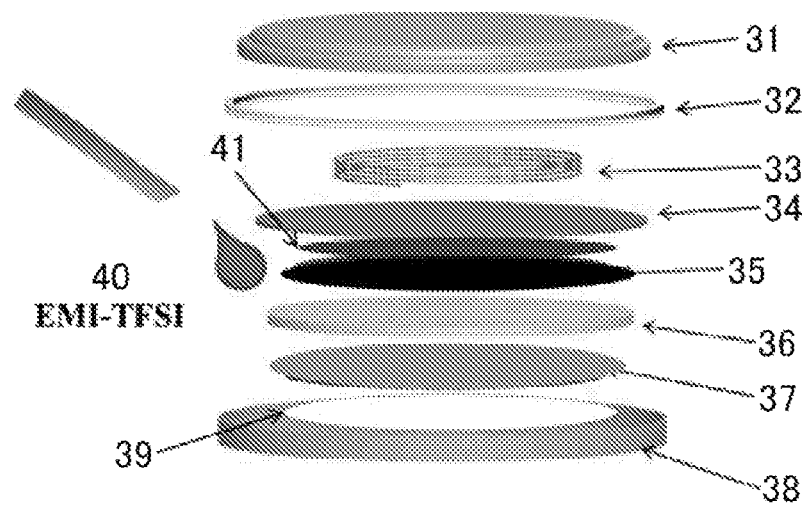
FIGS. 27(a) and 27(b) are explanatory diagrams of a full-cell type lithium-ion supercapacitor and are an obliquely-viewing development (a) of a coin cell including a full-cell type lithium-ion supercapacitor produced in this example and a structural diagram (b) of the full-cell type lithium-ion supercapacitor.
Figure 27:
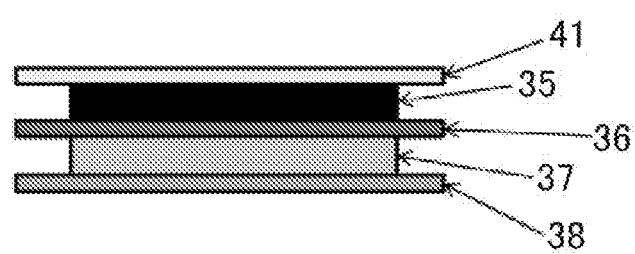

FIGS. 27(a) and 27(b) are explanatory diagrams of a full-cell type lithium-ion supercapacitor and are an obliquely-viewing development (a) of a coin cell including a full-cell type lithium-ion supercapacitor produced in this example and a structural diagram (b) of the full-cell type lithium-ion supercapacitor.

A configuration similar to Example 6 except that hard carbon is used as the cathode 37, and a graphene/CNT composite into which lithium ions are pre-doped is used as the anode 35 is employed. In addition, the LiPF$_6$ electrolytic solution is used.

The CV of this coin cell was measured at each of sweeping speeds of 5, 10, and 20 mV/s.

Figure 28:
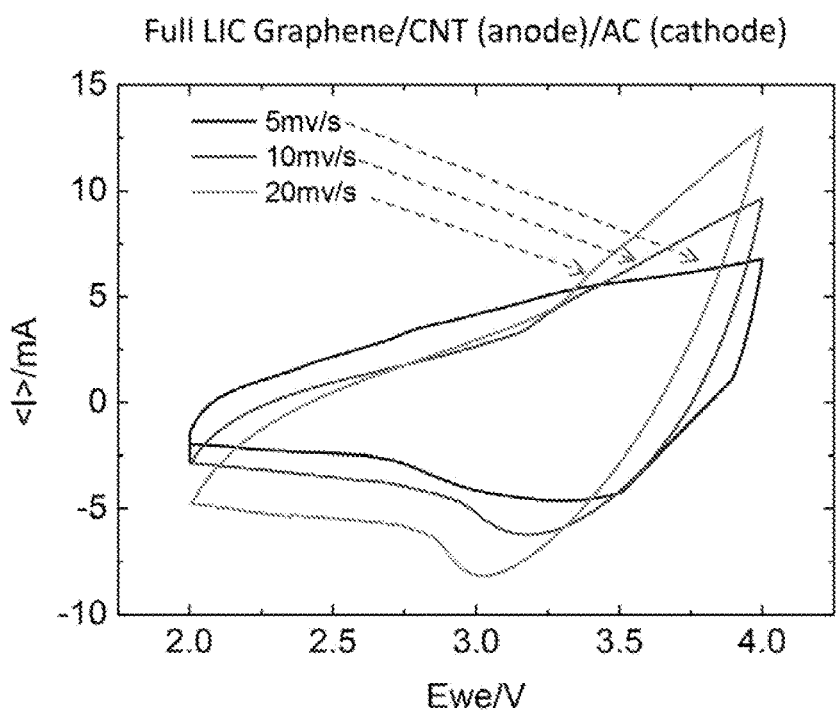
FIG. 28 is a CV curve of a coin cell (Example 8).

FIG. 28 is a CV curve of the coin cell (Example 8). The CV curve has an approximately triangle shape, and the capacitance (static capacitance) was calculated based on the area of the CV curve. In a case where the scanning speed is increased, the area was enlarged.

Example 9

(Manufacturing of Capacitor)
(Production of Half-Cell Type lithium-ion supercapacitor)

Similar to Example 7 having the configuration in FIGS. 7(a) to 7(c), a coin cell (Example 9) was produced.

This coin cell includes a half-cell type lithium-ion supercapacitor.

In this half-cell type lithium-ion supercapacitor, the film-like graphene/CNT composite was used as the cathode 37, and a lithium foil was used as the anode 35 that is a counter electrode. A solution acquired by dissolving 1 mol/L of LiPF$_6$ into an organic solvent acquired by mixing ethylene carbonate (EC) and diethyl carbonate (DEC) at the ratio of 1:1 (v/v) was used for the filling as the lithium ion electrolytic solution 40.

Figure 30:
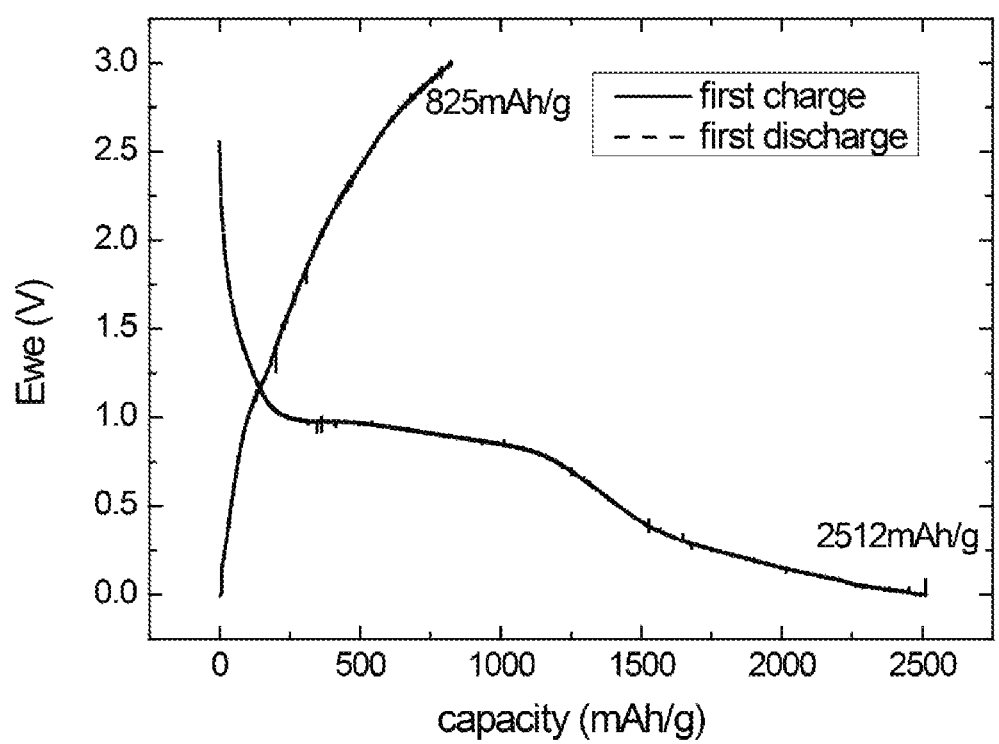
FIG. 30 is an initial charge/discharge profile of a graphene/CNT composite for 0 to 3 V at a current density of 50 mA/g.

FIG. 30 illustrates the performance of the anode for the first cycle. In the discharge performed at the first time, a very large capacity of 2515 mAh/g was given, and a reversible capacity of 815 mAh/g was acquired in the charge of the first time. The graphene/CNT prepared using a chemical co-reduction method not only exhibits performance higher than a previously-reported graphene/CNT and graphene/C60 (Yoo et al, Nano Letters, 8 (2008) 2277) but also matches graphene (H. Kim et al, Carbon, 2011, 49, 326) combined with a tin oxide representing high performance of Li accommodation. Such a large Li capacity satisfies a strict request for an LIC anode to which sufficient Li is given.

Example 10

(Production of Full-Cell Type Lithium-ion Supercapacitor)

Next, a full-cell type lithium-ion supercapacitor similar to Example 6 having the configuration in FIGS. 17(a) and 17(b) was produced.

A configuration similar to Example 6 except that a graphene/CNT composite is used as the cathode 37, and a graphene/CNT composite into which lithium ions are pre-doped is used as the anode 35 is employed. That is, a configuration similar to Example 8 is employed.

(Charge/Discharge Measurement)

By using the coin cell (Example 10), charge/discharge of the lithium-ion supercapacitor was measured for 2 to 4 V.

Figure 31:
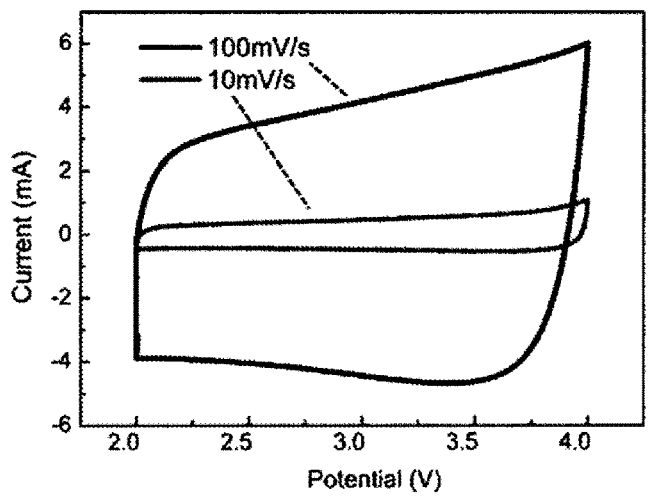
FIGS. 31(a) to 31(c) illustrate electrochemical characteristics of a dual graphene/CNT.
Figure 31:
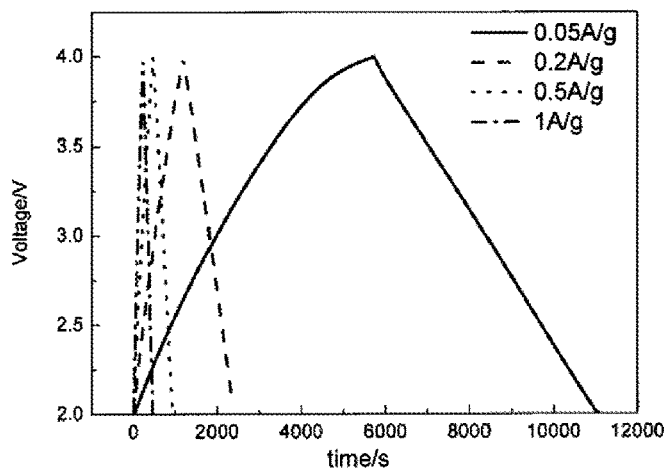
Figure 31:
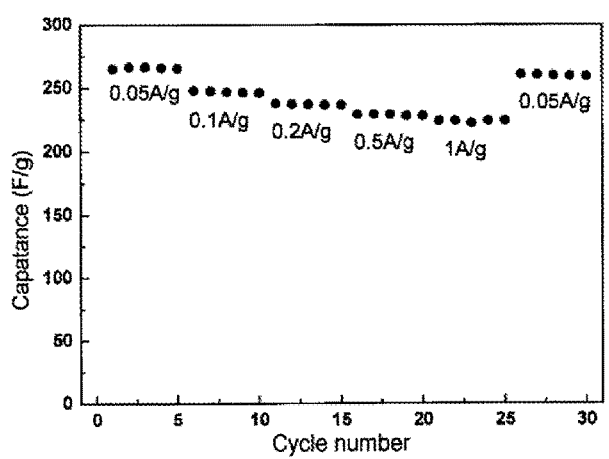

FIGS. 31(a) to 31(c) illustrate electrochemical characteristics of a dual graphene/CNT LIC. FIG. 31(a) illustrates a charge/discharge profile close to a rectangular shape representing a supercapacitor characteristic. FIG. 31(b) illustrates a charge/discharge profile for calculating a capacity at the time of changing the current density. For 50 mA/g, the capacity arrives at 274 F/g. In addition, the rate capability is illustrated in FIG. 31(c). It is illustrated that the specific capacitances of the dual graphene LIC respectively arrive at 237 F/g, 229 F/g, and 224 F/g for current densities of 200 mA/g, 500 mA/g, and 1000 mA/g, and the present LIC has a high rate capability.

For 2 to 4 V and a current density of 60 mA/g, the capacitance was 274 F/g, and the energy density was 114 Wh/kg.

INDUSTRIAL APPLICABILITY

A lithium-ion supercapacitor according to the present invention relates to a lithium-ion supercapacitor using a graphene/CNT composite electrode having a CNT concentration of 17 wt % or more and 33 wt % or less and has a high energy density and a power density, is capable of being charged/discharged many times, and has a long product life, and has a usability in a capacity industry, a battery industry, and the like.

REFERENCE SIGNS LIST

1 Anode
2 Cathode
3 Electrolytic solution
4 Anode
5 Cathode
6 Electrolytic solution
7 Anode
8 Cathode
9 Electrolytic solution
100 Electric double layer
10 Lithium-ion supercapacitor (LIC) using graphene/CNT cathode
11 Coin cell cap
12 Gasket
13 Spring
14 Steel spacer
15 Anode
16 Separator
17 Cathode
18 Coin cell case
19 Lithium ion electrolytic solution
20, 21 Current collector
25 Full cell
30 Coin cell
31 Coin cell cap
32 Gasket
33 Spring
34 Steel spacer
35 Anode
36 Separator
37 Cathode
38 Coin cell case
39 Current collector
40 Lithium ion electrolytic solution
41 Current collector

The invention claimed is:

1. A lithium-ion supercapacitor using a graphene/CNT composite electrode, the lithium-ion supercapacitor comprising:
an anode;
a cathode that is arranged to be separate from the anode; and
a lithium ion electrolytic solution that fills a space between the anode and the cathode,
wherein one or both of the cathode and the anode are formed by a graphene/CNT composite,
a CNT concentration in the graphene/CNT composite is 17 wt % or more and 33 wt % or less, and
CNTs in the graphene/CNT composite are arranged between graphene layers.

2. The lithium-ion supercapacitor using the graphene/CNT composite electrode according to claim 1, wherein the CNT concentration in the graphene/CNT composite is 17 wt % or more and 20 wt % or less.

3. The lithium-ion supercapacitor using the graphene/CNT composite electrode according to claim 2, wherein the graphene/CNT composite is a porous body.

4. The lithium-ion supercapacitor using the graphene/CNT composite electrode according to claim 2, wherein a separator is arranged between the anode and the cathode, and the separator is a porous polymer film or a glass fiber.

5. The lithium-ion supercapacitor using the graphene/CNT composite electrode according to claim 1, wherein the graphene/CNT composite is a porous body.

6. The lithium-ion supercapacitor using the graphene/CNT composite electrode according to claim 5, wherein pores having a pore diameter of 2 nm or more and 50 nm or less are formed in the porous body.

7. The lithium-ion supercapacitor using the graphene/CNT composite electrode according to claim 6, wherein a separator is arranged between the anode and the cathode, and the separator is a porous polymer film or a glass fiber.

8. The lithium-ion supercapacitor using the graphene/CNT composite electrode according to claim 5, wherein a separator is arranged between the anode and the cathode, and the separator is a porous polymer film or a glass fiber.

9. The lithium-ion supercapacitor using the graphene/CNT composite electrode according to claim 1, wherein the lithium ion electrolytic solution is a $LiPF_6$-dispersed solution.

10. The lithium-ion supercapacitor using the graphene/CNT composite electrode according to claim 9, wherein a separator is arranged between the anode and the cathode, and the separator is a porous polymer film or a glass fiber.

11. The lithium-ion supercapacitor using the graphene/CNT composite electrode according to claim 1, wherein the cathode is formed by the graphene/CNT composite, and the anode is graphite or lithium ion-added graphite.

12. The lithium-ion supercapacitor using the graphene/CNT composite electrode according to claim 11, wherein a separator is arranged between the anode and the cathode, and the separator is a porous polymer film or a glass fiber.

13. The lithium-ion supercapacitor using the graphene/CNT composite electrode according to claim 1, wherein a separator is arranged between the anode and the cathode, and the separator is a porous polymer film or a glass fiber.

14. The lithium-ion supercapacitor using the graphene/CNT composite electrode according to claim 1, wherein lithium ions are pre-doped into the graphene/CNT composite.

15. A method for manufacturing a lithium-ion supercapacitor using a graphene/CNT composite electrode, the method comprising:
- synthesizing graphene by synthesizing graphene oxide using a modified Hummer's method and then reducing the graphene oxide;
- preparing a suspension by mixing the graphene and CNTs in an organic solvent such that a CNT concentration in a total amount is 17 wt % or more and 33 wt % or less and then forming a film-like graphene/CNT composite by filtering the suspension; and
- configuring the film-like graphene/CNT composite as one electrode, arranging a counter electrode formed by graphite, lithium-added graphite, or a lithium foil to face one face of the one electrode through a separator formed by a porous polymer film or a glass fiber, and then filling a space between the electrodes with a lithium ion electrolytic solution.

\* \* \* \* \*